Oct. 25, 1966 K. H. FRIELINGHAUS 3,281,782

TRAFFIC SIGNAL CONTROLLER

Filed Jan. 17, 1964 11 Sheets-Sheet 1

INVENTOR.
K. H. FRIELINGHAUS
BY
Forest B. Hitchcock
HIS ATTORNEY

Oct. 25, 1966 K. H. FRIELINGHAUS 3,281,782

TRAFFIC SIGNAL CONTROLLER

Filed Jan. 17, 1964 11 Sheets-Sheet 2

INVENTOR.
K.H.FRIELINGHAUS
BY
Forest B. Hitchcock
HIS ATTORNEY

TYPICAL SIGNAL CONTROL SEQUENCE

| INTERVAL REGISTER STEPS | SIGNALS CONTROLLED |
|---|---|
| NO.1 | ØA VEHICLE GREEN |
| NO.2 | ØA PED. CLEARANCE |
| NO.3 | ØA VEHICLE AMBER |
| NO.4 | ØA VEHICLE RED |
| NO.5 | ØB VEHICLE INITIAL GREEN |
| NO.6 | ØB VEHICLE FINAL GREEN |
| NO.7 | ØB PED. CLEARANCE |
| NO.8 | ØB VEHICLE AMBER |
| NO.9 | ØB VEHICLE RED |
| NO.10 | ØA VEHICLE GREEN |

INVENTOR.
K.H.FRIELINGHAUS
BY
Forest B. Hitchcock
HIS ATTORNEY

INVENTOR.
K.H.FRIELINGHAUS
BY
Forest B. Hitchcock
HIS ATTORNEY

INVENTOR.
K. H. FRIELINGHAUS
BY
Forest B. Whitlock
HIS ATTORNEY

INVENTOR.
K.H.FRIELINGHAUS
BY
Forest B. Hitchcock
HIS ATTORNEY

INVENTOR.
K. H. FRIELINGHAUS
BY
Forest B. Hitchcock
HIS ATTORNEY

Oct. 25, 1966 K. H. FRIELINGHAUS 3,281,782

TRAFFIC SIGNAL CONTROLLER

Filed Jan. 17, 1964 11 Sheets-Sheet 8

INVENTOR.
K.H.FRIELINGHAUS
BY
Forest B. Hitchcock
HIS ATTORNEY

Oct. 25, 1966 K. H. FRIELINGHAUS 3,281,782

TRAFFIC SIGNAL CONTROLLER

Filed Jan. 17, 1964 11 Sheets-Sheet 9

INVENTOR.
K.H.FRIELINGHAUS
BY
Forest B. Hitchcock
HIS ATTORNEY

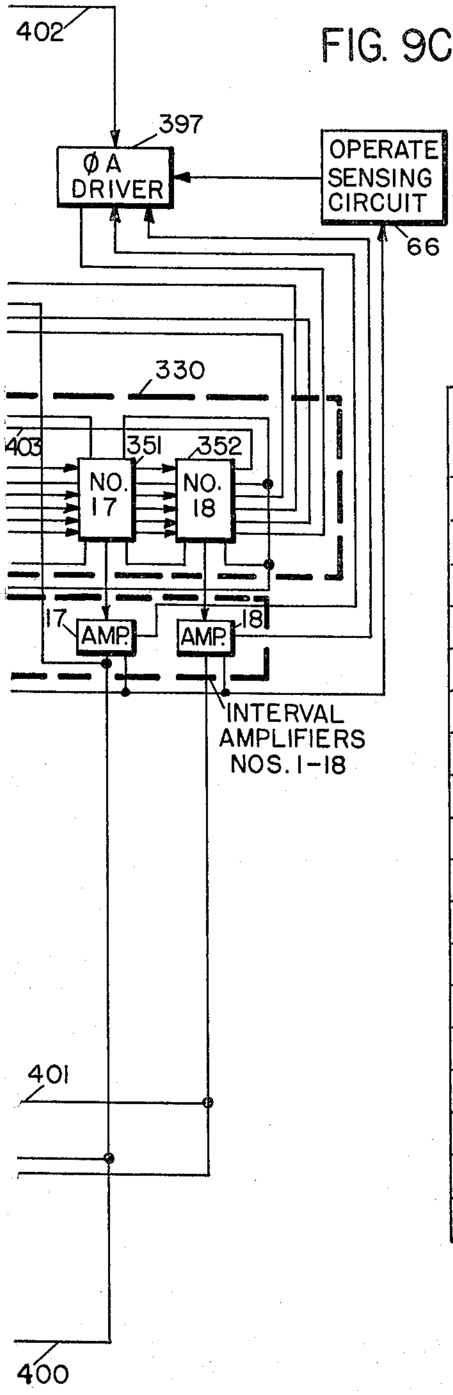

FIG. 9C

FIG. 9D

TYPICAL SIGNAL CONTROL SEQUENCE

| INTERVAL REGISTER STEPS | SIGNALS CONTROLLED |
|---|---|
| NO. 1 | ØB VEHICLE AMBER |
| NO. 2 | ØB VEHICLE RED |
| NO. 3 | ØB VEHICLE RED |
| NO. 4 | ØA VEHICLE INITIAL GREEN |
| NO. 5 | ØA WALK |
| NO. 6 | ØA PEDESTRIAN CLEARANCE |
| NO. 7 | ØA VEHICLE FINAL GREEN |
| NO. 8 | ØB PERMISSIVE PERIOD |
| NO. 9 | ØB PERMISSIVE PERIOD |
| NO. 10 | ØA VEHICLE AMBER |
| NO. 11 | ØA VEHICLE RED |
| NO. 12 | ØA VEHICLE RED |
| NO. 13 | ØB VEHICLE INITIAL GREEN |
| NO. 14 | ØB WALK |
| NO. 15 | ØB PEDESTRIAN CLEARANCE |
| NO. 16 | ØB VEHICLE FINAL GREEN |
| NO. 17 | ØA PERMISSIVE PERIOD |
| NO. 18 | ØA PERMISSIVE PERIOD |

INVENTOR.
K. H. FRIELINGHAUS
BY Forest B. Hitchcock
HIS ATTORNEY 3,281,782

TRAFFIC SIGNAL CONTROLLER

Klaus H. Frielinghaus, Rochester, N.Y., assignor to The General Signal Corporation, Rochester, N.Y., a corporation of New York Filed Jan. 17, 1964, Ser. No. 338,357
3 Claims. (Cl. 340—41)

This invention relates to a highway traffic signal controller, and, more particularly, pertains to such a traffic signal controller for electronically measuring only those portions of a signal cycle which are required to meet the demands of traffic at an intersection during all expected periods of control.

It is common practice to expeditiously control the movement of traffic at an intersection when such intersection is so located as to have at least a moderate volume of traffic on the different approaches to such intersection during recurring periods of each day. Depending upon the demands of traffic on one or more of the approaches to an intersection, it is usual to a lot at least a given portion of the signal cycle during which the proceed indication is displayed for each of the different approaches to the intersection. This type of control is generally referred to as "pre-timed" control. In another instance, it is usual to provide a proceed indication for the less-travelled approaches only during the times that vehicles are detected on such approaches up to a maximum time whereat the controller operates to provide a green display for the more heavily travelled approach to the intersection. At an intersection having similar volumes of traffic on each of its approaches, a proceed indication is provided for each approach according to detections thereon up to at least a maximum time. The above-mentioned types of control are more generally referred to as "semi-actuation" and "full-actuation" control.

In each type of control enumerated above, it is common practice to employ a cam shaft intermittently driven between its successive positions in each position of which a different portion of the signal cycle is measured during which the traffic signal is controlled to display a particular combination of signal indications. More specifically, in each position of the cam shaft, a cam functions to actuate contacts for completing signal control circuits as well as a timing circuit for measuring the time interval that the cam shaft remains in that position.

In certain instances of control for a traffic signal such as in either semi-actuation control or full-actuation control, it is desired to operate through the signal cycle in such a manner as to skip one or more portions thereof according to vehicle and/or pedestrian control. Such portion skipping is normally accomplished with a cam shaft type of controller by quick-stepping through the unwanted positions thereof which correspond to the portion of the signal cycle which are to be skipped, but the operation of the cam shaft through unwated positions requires at least a minimum time which limits the volume of traffic permitted through the controlled intersection. Moreover, one or more of the mechanical elements for at least one of the different positions of the cam shaft controller may malfunction even though the controller may be periodically serviced causing removal of control from the traffic signal. The traffic signal remains dark in all directions of traffic flow thus providing no control for a normally controlled intersection providing an unsafe condition to motorists wishing to enter such intersection.

Generally speaking, and without attempting to define the exact scope of the present invention, it is proposed to provide an all-electronic highway traffic signal controller having means including an electronic step-by-step means so arranged for overcoming the limitations of the above-numerated cam shaft type of controllers. More specifically, it is proposed to provide such an electronic step-by-step means having a predetermined number of steps in each of which an electronic device is operable for defining a predetermined portion of the signal cycle. Some electronic step-by-step means may operate through its different steps sequentially on a pre-timed basis whereby the time interval of operation for each such step is electronically measured. Alternatively, the electronic step-by-step means may operate through only certain ones of its steps according to vehicle and/or pedestrian calls while completely skipping electronically the unwanted steps thereof in the case of semi-actuation control or full-actuation control. In any of the above-mentioned types of control, the traffic signal controller of the present invention requires a minimum of time in operating between desired steps of the electronic step-by-step means which permits highly efficient control of the traffic signal during each signal cycle for governing a maximum volume of traffic movement through such intersection.

It is further proposed in the present invention to provide a means for sensing the operation of the electronic step-by-step means in each one of its steps. In the absence of operation for any one of its steps, such sensing means is effective to sense such non-operation of all steps and return operations of the electronic step-by-step means to a particular step thereof in which a portion of the signal cycle is defined where, for example, the traffic signal may be controlled to display a proceed indication to artery traffic.

It is contemplated that the traffic signal controller of the present invention when employed as a pre-timed controller, a semi-actuated controller or a fully-actuated controller may be operated subject to remote control signals such as the conventional offset and split signals. In addition to the offset and split signals, it is contemplated that the embodiments of the semi-actuated controller and fully-actuated controller be responsive to receive "permissive signals." A permissive period signal represents an interval of time during which a local controller may change from, for example, a final phase, designated phase A, to a first phase, designated phase B. One form of system, for example, for producing and communicating offset, split and permissive period signals to local controller locations may be of the form shown and described in the pending application Ser. No. 316,858, filed on October 17, 1963, by J. H. Auer, Jr. and J. P. Huffman.

Thus, one object of this invention is to provide a traffic signal controller having electronic step-by-step means for defining the different portions of a traffic cycle and in which one or more portions may be bypassed by electronically skipping the steps of such means corresponding thereto.

Another object of this invention is to provide a traffic signal controller in which the malfunctioning of any one part during the normal operation of which a corresponding portion of the signal cycle is defined causes the controller to operate for controlling the traffic signal to display a proceed indication to a preferred direction of traffic.

Another object of this invention is to provide a traffic signal controller comprised of electronic elements which operate to provide a highly efficient, durable and substantially maintenance free traffic signal controller.

Another object of this invention is to provide a highway traffic signal controller including an electronic step-by-step means so arranged that it may be adapted in a traffic signal controller operating on pre-timed control, semi-actuation control or full-actuation control.

Other objects, purposes and characteristic features of the present invention will become more apparent as the description of the invention progresses.

In describing the invention, reference will be made to the accompanying drawings in which:

FIGS. 1A and 1B with FIG. 1B placed to the right of FIG. 1A illustrate in block diagram from one embodiment of the present invention of the pre-timed controller type;

FIG. 1C is a chart showing a typical signal control sequence for a traffic signal cycle as defined by the operation of the embodiment of FIGS. 1A and 1B;

FIGS. 2A and 2B when placed with FIG. 2B to the right of FIG. 2A illustrate in part by block diagram and in part by detailed circuits the embodiment shown in FIGS. 1A and 1B;

Figures 1C, 8:
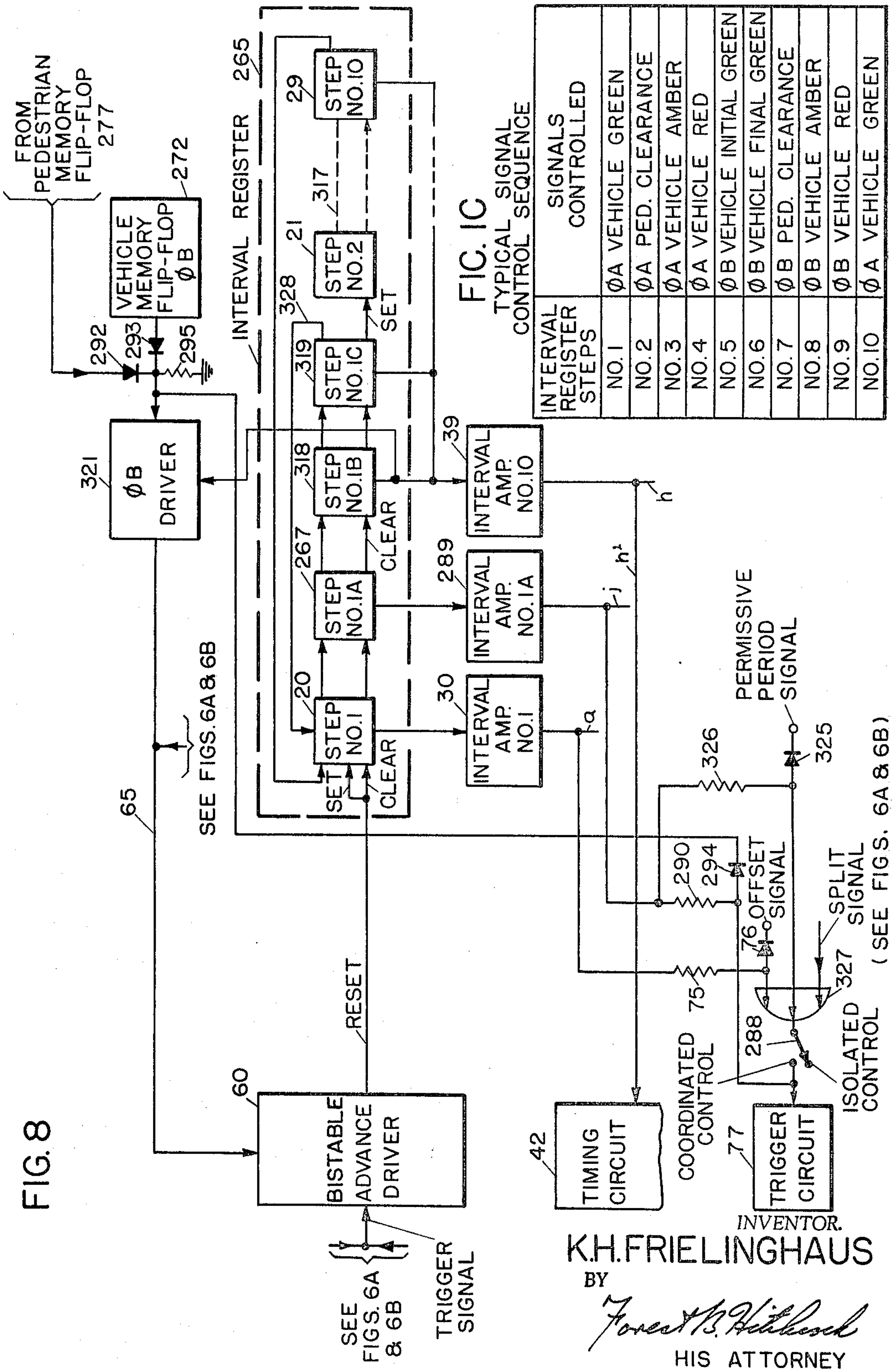
Figures 4, 5, 7:
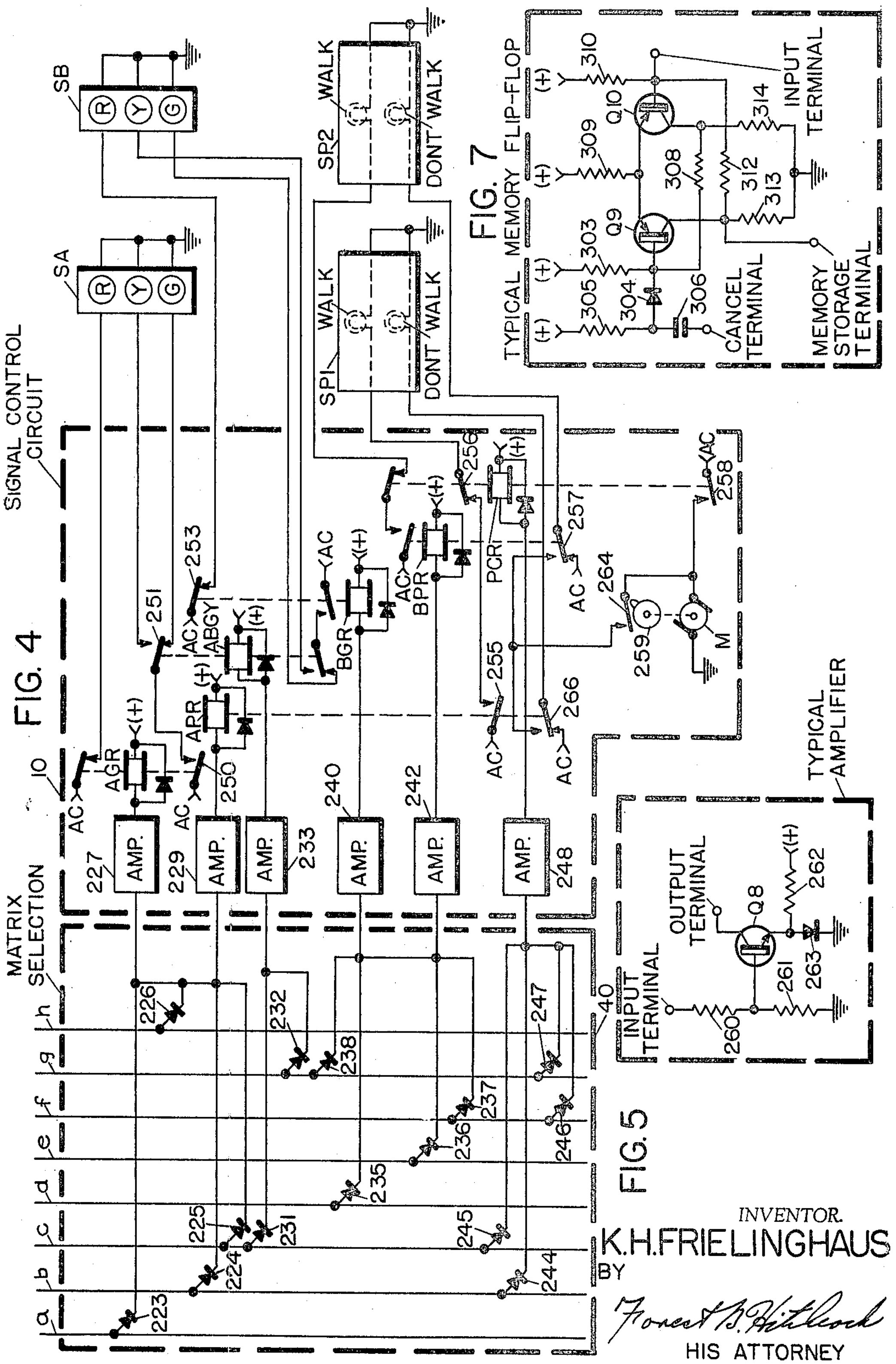
FIG. 4 illustrates in part detail signal control circuits for a portion of the embodiment shown in FIGS. 1A and 1B.
FIG. 5 illustrates in detail form a typical amplifier shown in block form in the embodiment of FIG. 4.
Figure 6A:
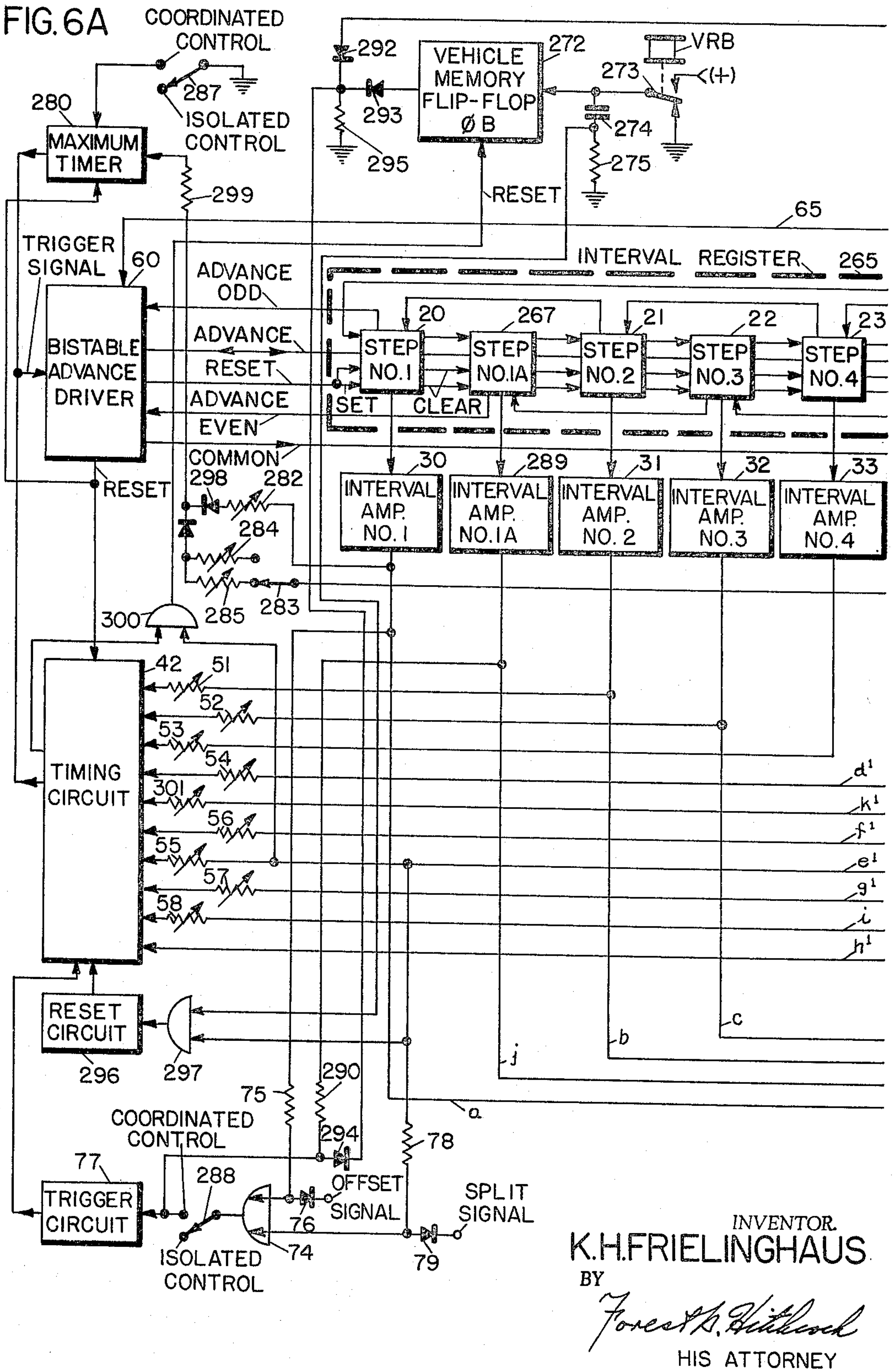
Figure 6B:
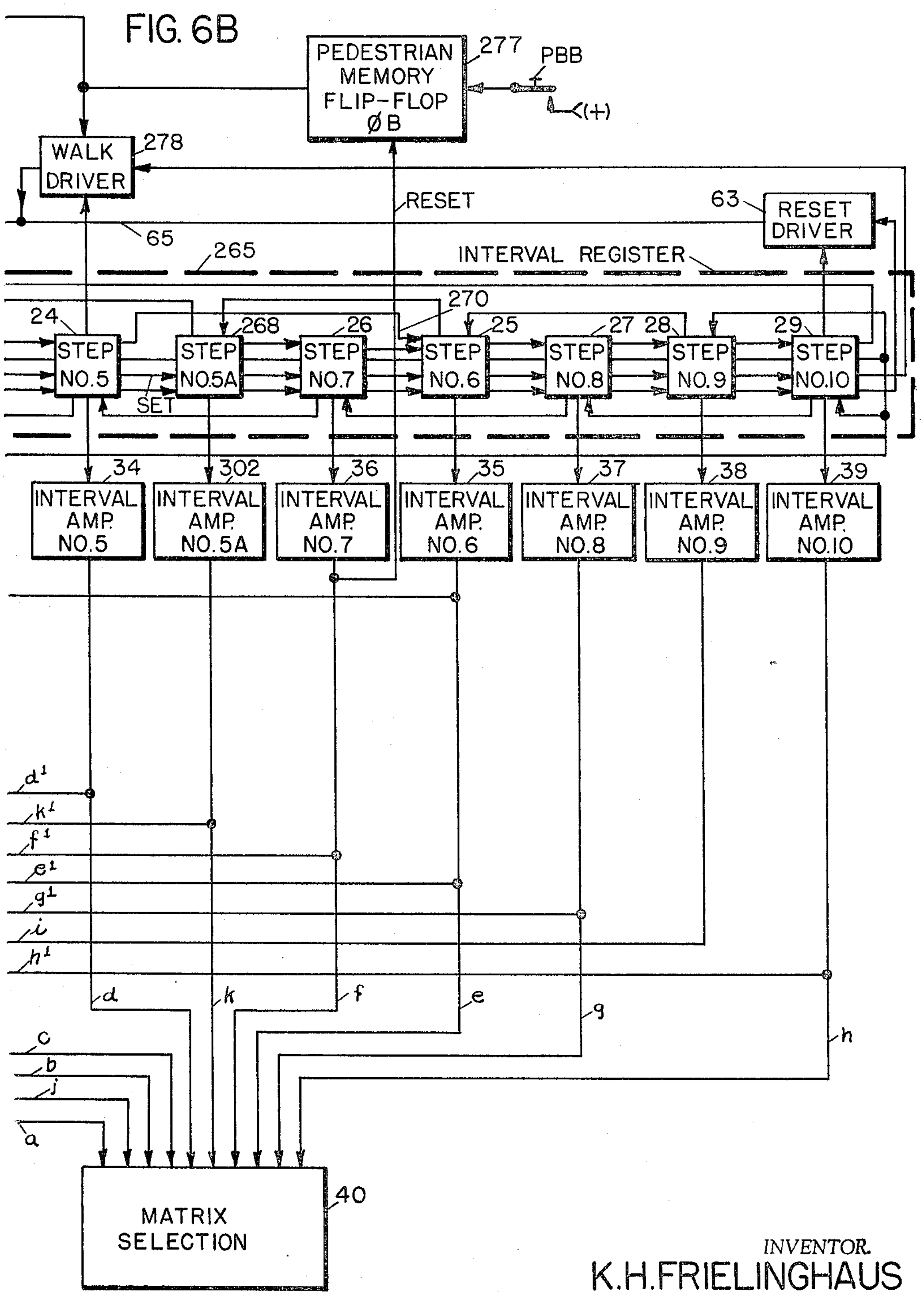
Figure 9A:
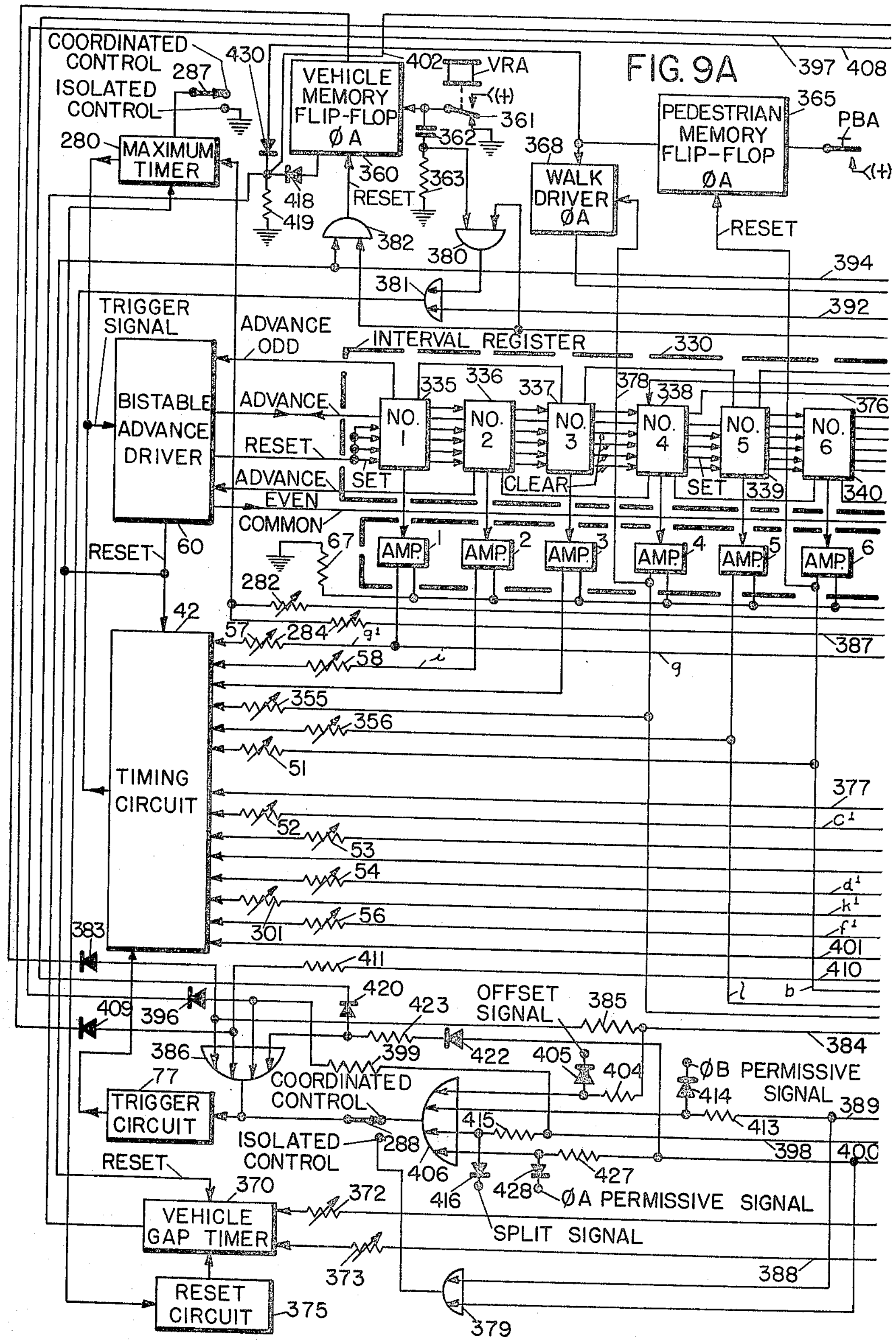
Figure 9B:
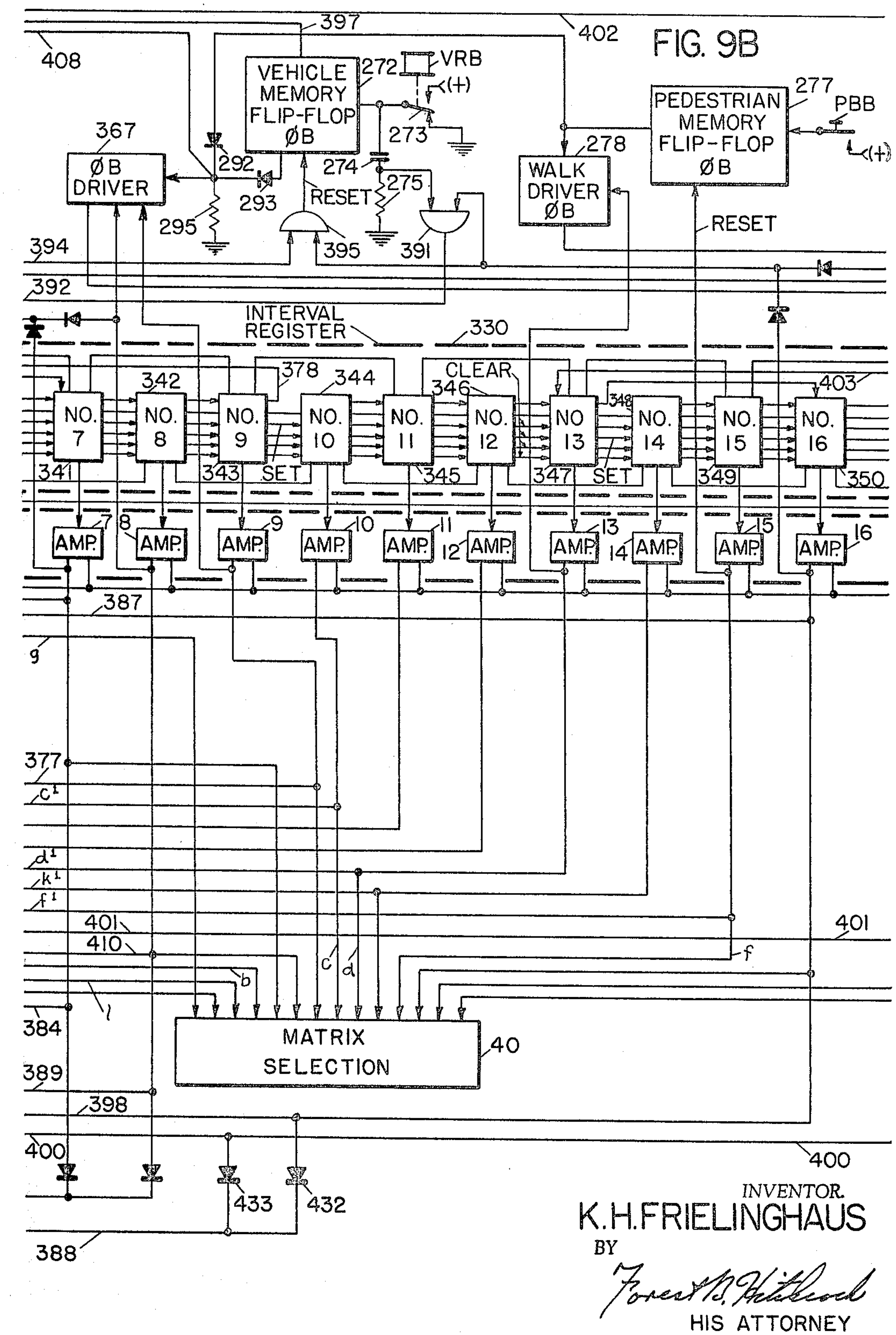

FIGS. 6A and 6B when placed with FIG. 6B to the right of FIG. 6A illustrate in block diagram form one embodiment of the present invention employed as a semi-actuated controller;

FIG. 7 illustrates in detailed form a typical memory flip-flop circuit employed in the embodiment of FIGS. 6A and 6B;

FIG. 8 illustrates in partial block diagram form the manner in which the embodiment of FIGS. 6A and 6B may be modified for coordinated control utilizing permissive period signals;

FIGS. 9A, 9B and 9C illustrate in block diagram form one embodiment of the present invention employed as a fully-actuated controller; and FIG. 9D is a chart showing a typical signal control sequence for a traffic signal cycle as defined by the operation of the embodiment of FIGS. 9A, 9B and 9C.

*General description*

At an intersection of a main street or artery with a cross street, it is common practice to employ a traffic signal for displaying proceed, stop and traffic change signal indication to each direction of traffic movement, such streets being more commonly referred to as phase A and phase B for a two-street intersection. In addition, it is common practice to employ pedestrian signals for permitting pedestrian movement across each of phase A and phase B at times according to the control of the traffic signal and, in certain instances, in response to a pedestrian call. The pedestrian signal for each of phase A and phase B commonly operates to provide a WALK indication and a DONT WALK indication, either steady or flashing. In the description of the embodiments of the present invention to follow infra, it is contemplated that each of the controller embodiments is provided for a two-phase intersection having vehicle and pedestrian signals, but it should be understood that the present invention can readily be organized in a controller for an intersection having three or more phases as will become more apparent as the description progresses.

EMBODIMENT AS A PRE-TIMED TRAFFIC SIGNAL CONTROLLER—FIGURES 1A, 1B, 2A, 2B

Figure 1A:
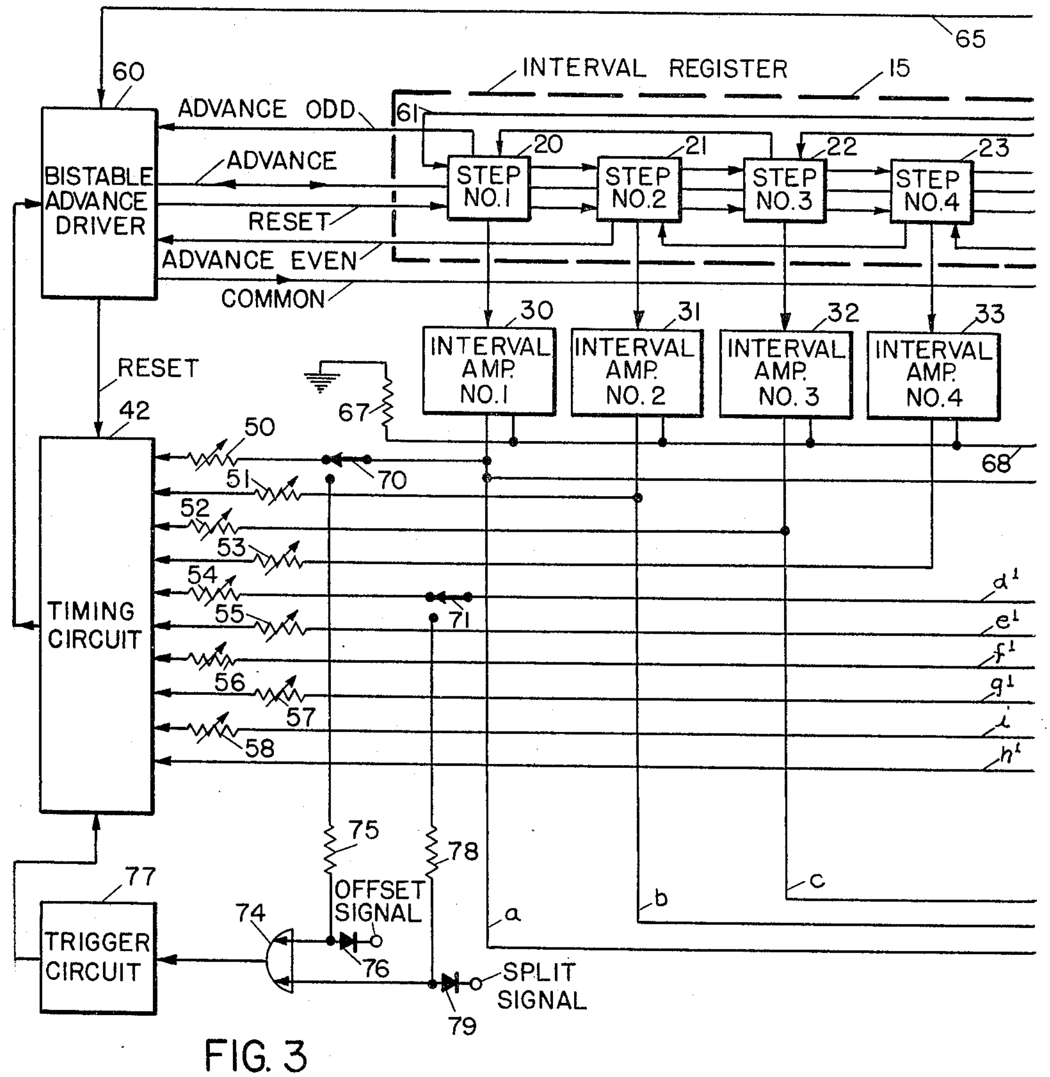
Figure 1B:
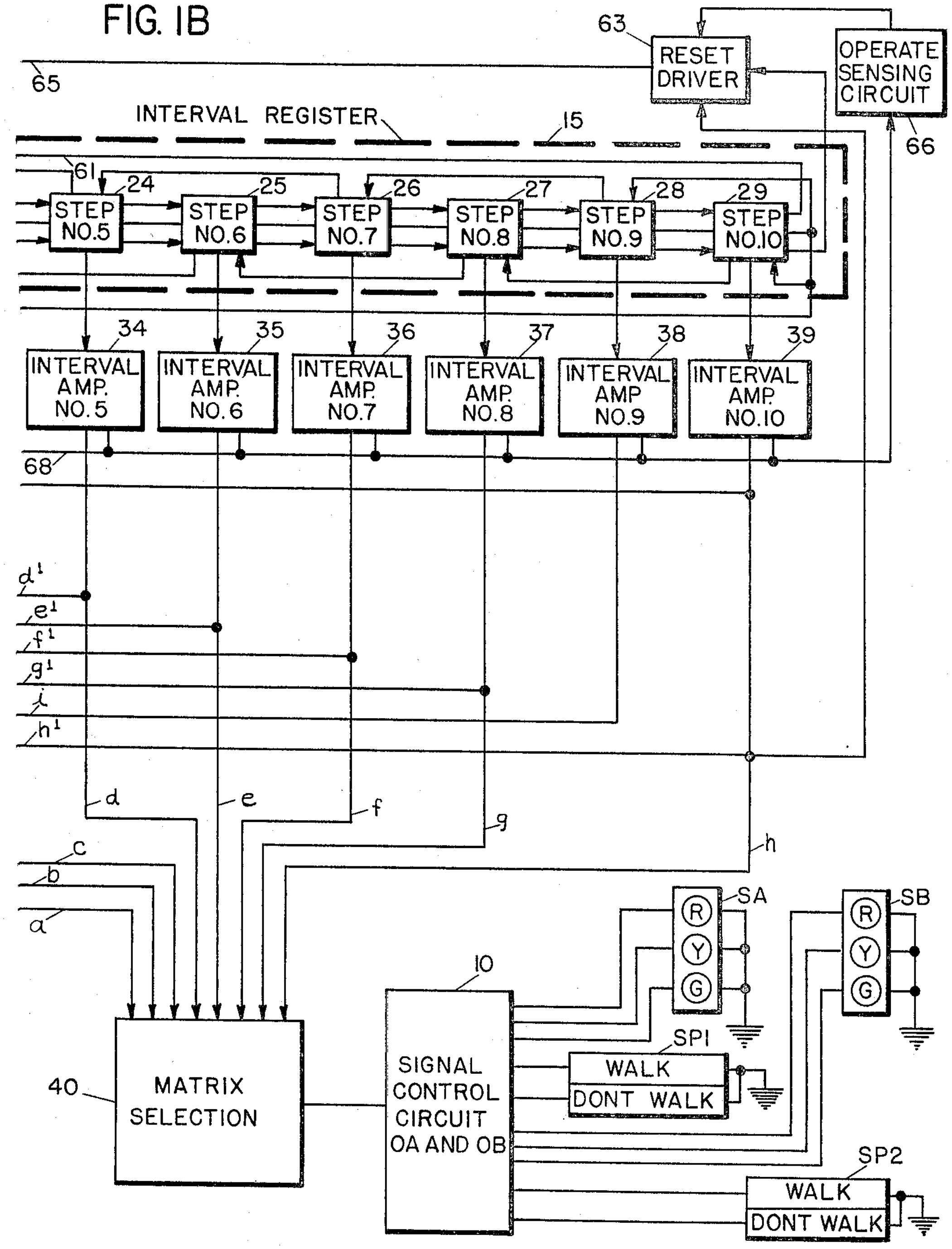
Figure 2A:
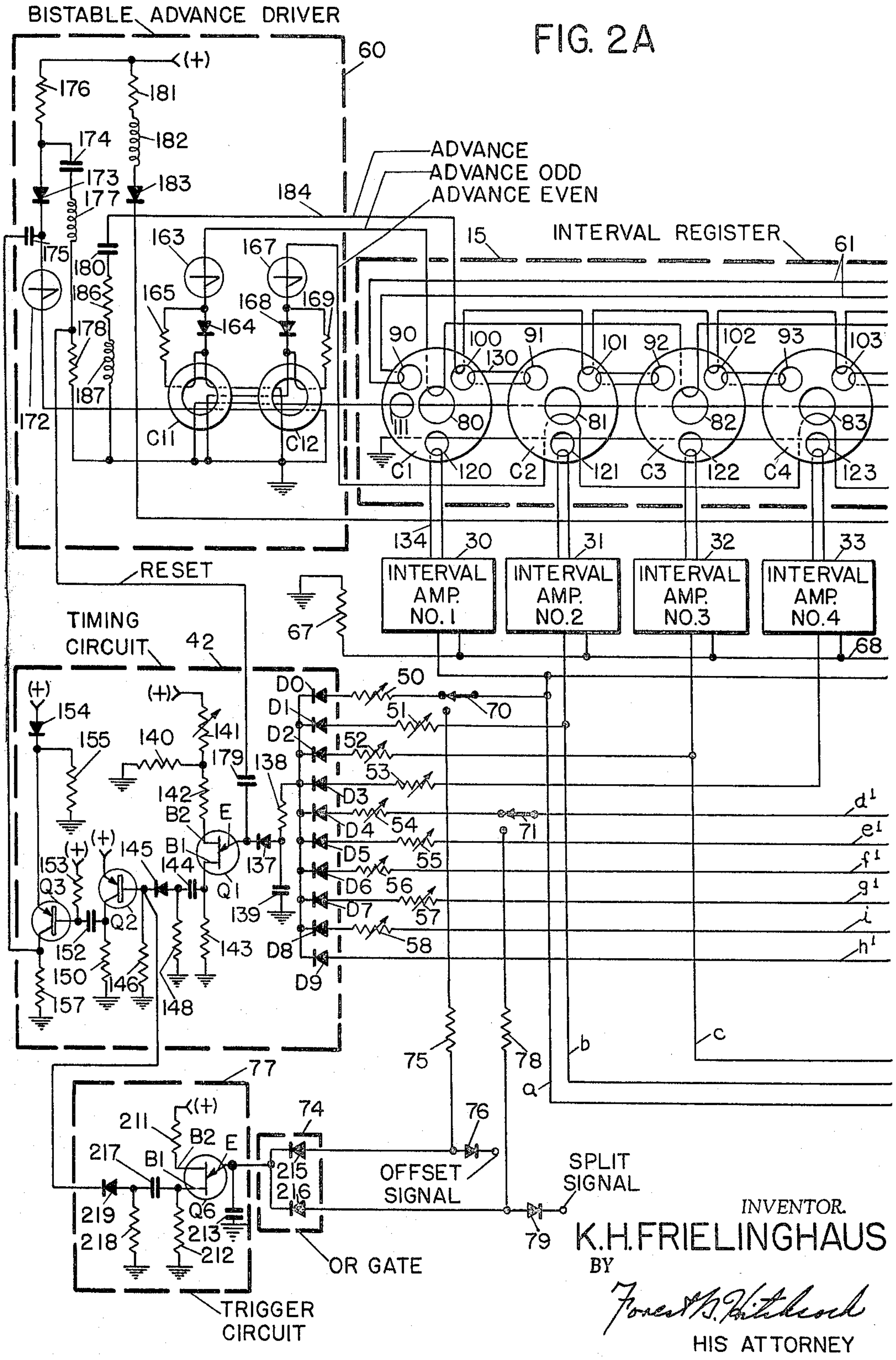
Figure 2B:
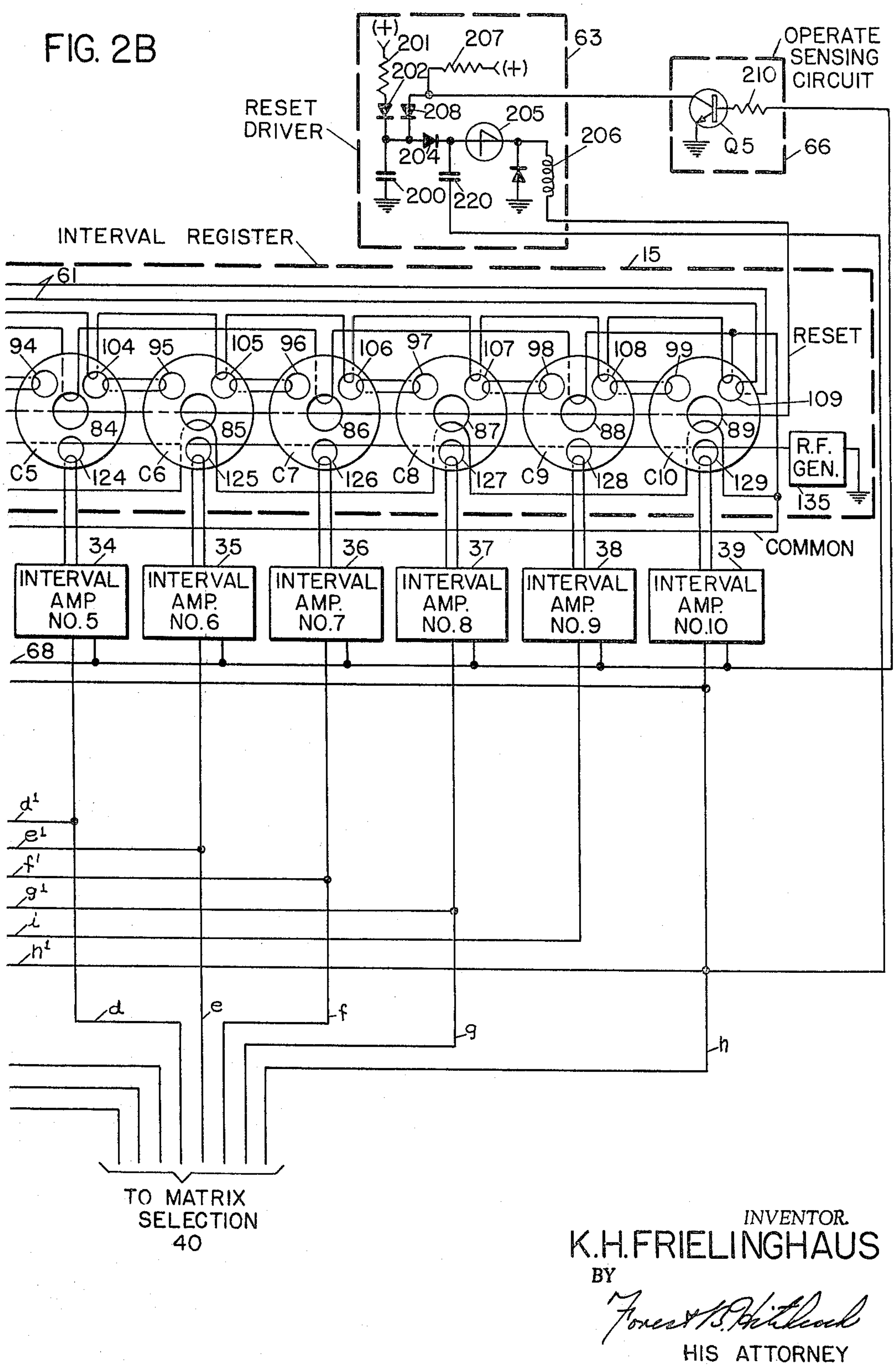

In describing the invention as embodied in the form of a pre-timed traffic signal controller, reference is made to FIGS. 1A and 1B as well as FIGS. 2A and 2B. In particular, and referring specifically to FIG. 1B, the vehicle signals SA corresponding to phase A and SB corresponding to phase B for a two-phase intersection are illustrated. Each of the vehicle signals SA and SB includes proceed, change and stop signal indications indicated respectively as G, Y and R. Pedestrian signals SP1 corresponding to phase A and SP2 corresponding to phase B are also illustrated. Each of the pedestrian signals SP1 and SP2 includes WALK and DONT WALK indications.

Vehicle signals SA and SB and pedestrian signals SP1 and SP2 are controlled selectively by signal control circuit 10. Generally speaking, signal control circuit 10 is comprised of a plurality of individual circuits which are operated selectively in combination to cause the vehicle signals SA and SB and the pedestrian signals SP1 and SP2 to display a combination of signal indications allotted to the portion of the signal cycle in which the controller is then operated.

The different portions of a signal cycle for a two-phase intersection are defined by the different steps of an interval register 15, these steps being numbered 1–10 and designated respectively 20–29. An output is derived from each of the steps 20–29 when interval register 15 operates in that step which is coupled to an interval amplifier, these interval amplifiers being numbered 1–10 and designated respectively 30–39. Each of the interval amplifiers 30–39 except interval amplifier 33 and 38 when responsive to an output from its corresponding step of the steps 20–29 of interval register 15 provides an output which is coupled through a matrix selection 40 to signal control circuit 10 for controlling the appropriate vehicle and pedestrian signals. Interval amplifiers 33 and 38 correspond to steps 23 and 28 which are the vehicle red intervals.

The time interval that interval register 15 operates in each of its steps 20–28 is electronically measured by a timing circuit 42 including a variable resistor timing element individual to each of the steps 20–28. For steps 20–28, the variable timing resistor elements are designated respectively 50–58. Upon measurement of each time interval, timing circuit 42 provides a trigger output which is coupled to a bistable advance driver 60 for advancing interval register 15 to its step adjacent the then operating step.

Bistable advance driver 60 is operable to two different conditions. In each of such two conditions, bistable advance driver 60 operates to advance interval register 15 from its then operating step to its next successive step wherein interval register 15 operates for a measured time interval. More specifically, in the first of its two conditions, bistable advance driver 60 provides an output which is applied to the odd-positioned steps 20, 22, 24, 26 and 28 of interval register 15. In the second of its two conditions, bistable advance driver 60 applies its output to even-positioned steps 21, 23, 25, 27 and 29 of interval register 15. In each of such two conditions, only the step which is conditioned by a preceding operating step is rendered operative upon receiving the output from bistable advance driver 60.

In the operation of interval register 15 between its steps 20–29, transfer of operation is effected sequentially. Upon reaching step 29, operation of interval register 15 is transferred to its step 20 according to the operation of reset driver 63. More specifically, the output of step 29 taken from its interval amplifier 39 is coupled to reset driver 63 causing it to provide an output which is coupled to bistable advance driver 60 over wire 65 causing bistable advance driver 60 to provide its ADVANCE output for operating step 20. In addition, a transfer winding 61 is provided between step 29 and step 20 for assuring that transference of operation between such steps takes place upon failure of reset driver 63.

The operation of interval amplifiers 30–39 is sensed by an operate sensing circuit 66 and a resistor 67. More specifically, as long as one of interval amplifiers 30–39 is operating, a positive-going voltage appearing across resistor 67 is applied to operate sensing circuit 66 which prevents operate sensing circuit 66 from providing its output to reset driver 63. However, when all interval amplifiers 30–39 become simultaneously inactive, ground is applied through resistor 67 and over wire 68 to operate sensing circuit 66 rendering it effective to provide an output to reset driver 63. Reset driver 63 then couples its output to bistable advance driver 60 over wire 65 causing bistable advance driver 60 to apply its advance output to interval register 15 for causing operation of, for example, step 20 thereof. In other words, the possible malfunction of interval register 15 to the extent that all of its steps become inactive causes return of operation of interval register 15 to its step 20. In step 20, control of the vehicle and pedestrian signals may be such as to cause a proceed indication to be displayed to the most heavily travelled phase.

FIG. 1C illustrates in chart form a typical signal control sequence for the embodiment of the traffic signal controller of FIGS. 1A and 1B. Referring to FIG. 1A, it is noted that the chart shows a column headed INTERVAL REGISTER STEPS, these being numbered 1–10 and corresponding respectively to steps 20–29 of interval register 15. A second column headed SIGNALS CONTROLLED lists the principal vehicle signal of the combination controlled for each of the step Nos. 1–10. For example, in step No. 1 of interval register 15, it is suggested that the phase A traffic signal SA be controlled to display a proceed or green indication for vehicular traffic on phase A. In this connection, the traffic signal SB is controlled to display the stop or red indication for phase B during the time that the phase A proceed indication is displayed. In addition, pedestrian signal SP1 is controlled to display a WALK indication for permitting pedestrian movement across phase B, while pedestrian signal SP2 is controlled to display a DONT WALK indication for prohibiting pedestrian movement across phase A at the intersection.

Referring again to FIGS. 1A and 1B, it is noted that the outputs of interval amplifiers 30 and 34 are applied through respective switches 70 and 71 to timing circuit 42 through variable resistors 50 and 54 in the illustrated positions of switches 70 and 71. In order that the controller of FIGS. 1A and 1B be operated from a remote station, however, switches 70 and 71 are operated to their second positions which renders timing circuit 42 ineffective to provide an output to bistable advance driver 60 when interval register 15 operates respectively in its steps 20 and 24. When interval register 15 operates in its step 20, its output is applied through interval amplifier 30 and switch 70 to OR gate 74 through a resistor 75. However, in the absence of an offset signal as provided in the manner disclosed in the above-mentioned Auer et al. application Ser. No. 316,858 the output of interval amplifier 30 is shunted to ground through resistor 75 and diode 76. In the presence of an offset signal, however, diode 76 is back-biased to permit the output of amplifier 30 to be applied through OR gate 74 to trigger circuit 77. Trigger circuit 77 upon receiving an input provides an output which is coupled to timing circuit 42 to cause it to provide its trigger output for advancing interval register 15 to its next step 21. In this manner of operation, interval register 15 remains in its step 20 until the offset signal is received during which time the vehicle and pedestrian signals are controlled to cause a proceed indication to be displayed for phase A and a stop indication to be displayed for phase B, while additionally causing the pedestrian signal SP1 to display a WALK indication and pedestrian signal SP2 to display a DONT WALK indication.

While interval register 15 operates in its step 24, the proceed indication is displayed for phase B as suggested in step No. 5 of the chart illustrated in FIG. 1C. This interval is suggested to be an initial green interval which is dependent upon the arrival of a split signal from the control office. More specifically, the output of interval amplifier 34 is applied over wire *d'* and through a circuit including switch 71 in its second position and resistor 78 to OR gate 74. In the absence of a split signal, however, such output from amplifier 34 is shunted to ground through a diode 79. Upon reception of the split signal, diode 79 is back-biased to permit the output of amplifier 34 to be applied through OR gate 74 to trigger circuit 77 causing it to provide its output which is coupled to timing circuit 42. Timing circuit 42 then provides its trigger output for operating interval register 15 from its step 24 to its next step 25. During the operation of interval register 15 in its step 24, the vehicle signal SB is controlled to display a proceed indication for phase B while the vehicle signal SA is controlled to display a red or stop indication for phase A, while pedestrian signal SP2 is controlled to display a WALK indication and pedestrian signal SP1 is controlled to display a DONT WALK indication.

FIGS. 2A and 2B show one detailed circuit form of the embodiment shown in FIGS. 1A and 1B. Referring to FIGS. 2A and 2B, it is noted that interval register 15 includes a multi-aperture ferrite core for each of its steps 20–29, these multi-aperture cores being designated C1–C10 respectively.

In the art of multi-aperture cores, it is well known that each core includes a major aperture through which a clear input is coupled for placing the core in a non-operating condition. Each such multi-aperture core further includes at least one minor aperture to which is coupled a set signal provided for controlling the core to an operating condition. An output is derived from the operating core through another minor aperture which is dependent upon the set condition of the core and the type of output required. In this connection, a radio frequency signal may be coupled to the output aperture for providing prime and read pulses at a radio frequency rate for causing the output to be provided at the frequency rate according to the set condition of the core.

In the present example, each of the multi-aperture cores C1–C10 includes a major aperture, these major apertures being designated respectively 80–89. Each of the cores C1–C10 further includes a receiving minor aperture, these receiving minor apertures being designated respectively 90–99, while also including a transmitting minor aperture, these transmiting minor apertures being designated respectively 100–109. Multi-aperture core C1 includes a second receiving minor aperture 111. Cores C1–C10 each includes a read-out minor aperture, such readout minor apertures being designated respectively 120–129.

The transmitting minor aperture for each of the cores C1–C10 is coupled to the receiving minor aperture of the next adjacent core such as, for example, transmitting minor aperture 100 of core C1 being coupled over wire 130 to receiving minor aperture 91 of core C2. Core C10 has its transmitting minor aperture 109 coupled over wire 61 to receiving minor aperture 90 of core C1. It is suggested here that the manner of coupling energy from an operating core at its transmitting minor aperture to the receiving minor aperture of an adjacent core for setting that core is well known in the art.

Each of the cores C1–C10 has its readout minor aperture coupled to its respective interval amplifier such as, for example, readout minor aperture 120 coupled over wire 134 to interval amplifier 30. Readout minor apertures 121–129 for respective cores C2–C10 are also coupled by illustrated wires to respective interval amplifiers 31–39. An RF generator 135 is coupled to the readout minor apertures 120–129 for providing prime and read pulses at the rate of the radio frequency of generator 135 in order that the operating core be effective to provide a continuous output to its interval amplifier. The operation employing an RF generator with readout minor apertures of multi-aperture magnetic cores is conventional practice.

The respective outputs of interval amplifiers 30–32, 34–37 and 39 are coupled through matrix selection 40 to signal control circuit 10 over respective wires *a, b, c* etc.

In addition, the outputs of interval amplifiers 30–38 are coupled to timing circuit 42 through variable resistors 50–58. The output of interval amplifier 39 is coupled directly to timing circuit 42. In this connection, the outputs from interval amplifiers 34–39 are coupled to timing circuit 42 over respective wires *d'*, *e'*, *f'*, *g'*, *i'* and *h'*.

Timing circuit 42 includes a unijunction type transistor Q1 having an emitter E, a first base B1 and a second base B2. Under normal operating conditions, emitter E of unijunction transistor Q1 is coupled to the output of the operating interval amplifier 30–39 through diode 137, resistor 138, one of the diodes D0–D9 and one of the variable resistors 50–58 corresponding respectively to the operating interval amplifier. A capacitor 139 being electrically connected to the common connection of diode 137 and resistor 138 is charged during the operation of one of the interval amplifiers 30–39 for raising the potential applied to emitter E of unijunction transistor Q1 to its firing level. Base B2 is coupled to a biasing circuit including resistors 140 and 141 through a resistor 142. Base B1 is coupled to ground through a resistor 143 and to the base circuit of a PNP type transistor Q2 through a capacitor 144 and a diode 145. The base of transistor Q2 is also coupled to ground through a resistor 146. A discharge circuit for capacitor 144 includes resistors 143 and 148. The emitter of transistor Q2 is coupled to (+) energy, while its collector is coupled to ground through a resistor 150 and to the base circuit of a PNP type transistor Q3 through a capacitor 152. The base of transistor Q3 is also coupled to (+) energy through a resistor 153. The emitter of transistor Q3 is coupled to a biasing circuit including diode 154 and resistor 155, while the collector of transistor Q3 is coupled to ground through resistor 157. The output of timing circuit 42 is taken from the top side of resistor 157 and applied to bistable advance driver 60.

It is mentioned above that bistable advance driver 60 has two conditions of operation in each condition of which it provides an output for advancing interval register 15 to its next step. Bistable advance driver 60 includes two circuits, each such circuit for defining one of its two conditions. More specifically, one circuit includes a single-aperture core C11, a four-layer diode 163, and a coupling circuit including a diode 164 and resistor 165. The other circuit includes a single-aperture core C12, a four-layer diode 167 and a coupling circuit including a diode 168 and a resistor 169. The anode circuit of four-layer diode 163 is coupled to the major apertures 80, 82, 84, 86 and 88 of respective cores C1, C3, C5, C7 and C9, while the anode circuit of four-layer diode 167 is coupled to the major apertures 81, 83, 85, 87 and 89 of respective cores C2, C4, C6, C8 and C10.

Bistable advance driver 60 also includes a triggering circuit having a four-layer diode 172, a diode 173 and capacitor 174. Such triggering circuit becomes effective only upon application of an input trigger signal through capacitor 175 to the anode circuit of four-layer diode 172. Normally, capacitor 174 is charged through the circuit including resistor 176, coil 177 and resistor 178 and is discharged through the triggering circuit when four-layer diode 172 is rendered conductive. The cathode circuit of four-layer diode 172 is coupled through the apertures of cores C11 and C12 to ground to cause the core then in its set condition to be operated to its clear condition wherein the corresponding ADVANCE ODD or ADVANCE EVEN signal is provided. In addition, a RESET signal is coupled to timing circuit 42 through capacitor 179 for returning unijunction transistor Q1 to its non-conductive condition after it is fired. A capacitor 180 is normally charged through a circuit including resistor 181, coil 182, diode 183, a COMMON wire, ADVANCE wire 184 which threads the transmitting minor apertures 100–109 of respective cores C1–C10, resistor 186 and coil 187. The discharge circuit for capacitor 180 includes one of the four-layer diodes 163 or 167 which is rendered conductive and the ADVANCE ODD or ADVANCE EVEN wire threading the corresponding major apertures of cores C1–C10 along with the ADVANCE wire threading the transmitting minor apertures 100–109 of cores C1–C10.

Figure 3:
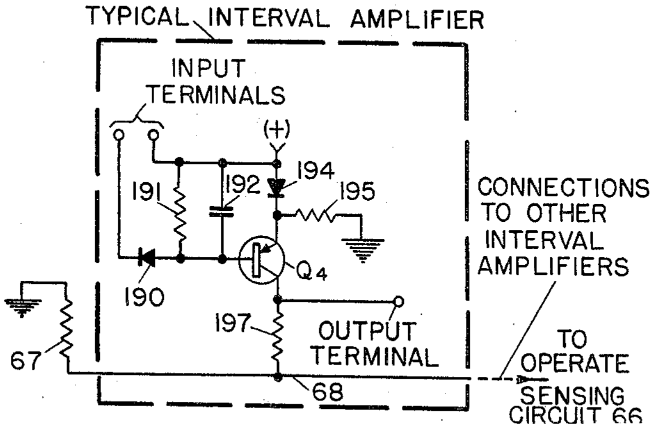
FIG. 3 illustrates in detail form a typical interval amplifier shown in block form in the embodiment of FIGS. 1A and 1B of FIGS. 2A and 2B.

Each of the interval amplifiers 30–39 may be similar to the interval amplifier shown in detail in FIG. 3. More specifically, and referring to FIG. 3, the typical interval amplifier includes a PNP type transistor Q4 which has its base circuit connected to INPUT TERMINALS through a diode 190, resistor 191 and capacitor 192. These elements comprise a rectifying circuit such that the output of an operating core coupled to the base of transistor Q4 renders it conductive. The emitter of transistor Q4 is connected to a biasing circuit including diode 194 and resistor 195. The collector of transistor Q4 is coupled through a resistor 197 to wire 68 to which all interval amplifiers 30–39 are connected and to ground through resistor 67. The output of transistor Q4 is taken from the top side of resistor 197 and applied to an OUTPUT TERMINAL from where such output is coupled for example to timing circuit 42 through one of the variable resistors 50–58 and to signal control circuit 10 through matrix selection 40.

Reset driver 63 includes a capacitor 200 having a charging circuit including resistor 201 and diode 202. The discharging circuit for capacitor 200 includes a diode 204, a four-layer diode 205 when rendered conductive, a coil 206, a RESET wire threading the major apertures of cores C2–C10 and minor aperture 111 of core C1 as well as the apertures of cores C11 and C12. A gating circuit including resistor 207 and diode 208 normally causes four-layer diode 205 to be non-conductive. That is, diode 208 is back-biased by the input from operate sensing circuit 66 so as to prevent the application of (+) energy to the anode circuit of four-layer diode 205 through diode 204.

Operate sensing circuit 66 includes a NPN type transistor Q5 which has its emitter coupled to ground and its collector coupled to (+) energy through resistor 207 in reset driver 63. The base of transistor Q5 is coupled through resistor 210 to one side of resistor 67 over wire 68 and to each of the interval amplifiers 30–39.

Trigger circuit 77 includes a unijunction transistor Q6 having its base B2 connected to (+) energy through resistor 211 and its base B1 coupled to ground through resistor 212. Transistor Q6 has its emitter E coupled to ground through capacitor 213 and to OR gate 74 which includes diodes 215 and 216. The output of trigger circuit 77 is coupled through capacitor 217 as resistor 218 is charged and coupled through a diode 219 to timing circuit 42. More specifically, such output of transistor Q6 is applied to the base of transistor Q2 for causing transistors Q2 and Q3 to operate to provide the trigger signal output to bistable advance driver 60.

OPERATION—FIGURES 1A, 1B, 2A, 2B, and 3

The embodiment of the present invention shown in FIGS. 1A and 1B as well as FIGS. 2A and 2B and FIG. 3 will now be considered with respect to its operation. In this connection, such embodiment will be first considered for operation as a pre-timed traffic signal controller where switches 70 and 71 are in their positions illustrated.

Upon application of energy to the various circuits, core C1 of interval register 15 is initially operated. More specifically, capacitor 180 is initially charged through its charging circuit including minor apertures 100–109 of cores C1–C10 causing these minor apertures to be primed. Capacitor 200 in reset driver 63 is also charged by its charging circuit described supra. Four-layer diode 205 in reset driver 63 is initially non-conductive but is rendered conductive in that diode 208 is forward-biased because of the non-conductive of transistor Q5 in operate sensing circuit 66. At this time, none of cores C1–C10 are operating which permits operate sensing circuit 66 to be coupled to ground through resistor 67 for rendering transistor Q5 non-conductive. Upon conduction of four-layer diode 205, a clear pulse is applied through major apertures 81–89 of cores C2–C10 respectively for clearing cores C2–C10 through minor aperture 111 of core C1 for setting core C1. The same clear pulse is applied through the apertures of cores C11 and C12 in bistable advance driver 60 setting core C11 and clearing core C12. With core C1 now set, a readout signal is coupled from its minor aperture 120 to its corresponding interval amplifier 30 over wire 134.

The presence of the readout signal applied to interval amplifier 34 causes its transistor similar to transistor Q4 as shown in FIG. 3, for example, to be turned on thus permitting current flow through resistors 67 and 197 causing outputs thereof to be applied respectively to the OUTPUT TERMINAL and operate sensing circuit 66 over wire 68 for therein causing transistor Q5 to be turned on.

During the operation of interval register 15 in its step 20 wherein core C1 operates, an output is applied over wire *a* from interval amplifier 30 to signal control circuit 10 through matrix selection 40 to operate the corresponding combination of vehicle and pedestrian signals. Such output is also applied through variable resistor 50 to emitter circuit E of unijunction transistor Q1 through diode D0, resistor 138 and diode 137. Capacitor 139 is charged by such output to the firing level of unijunction transistor Q1 in a time interval determined by the setting of variable resistor 50. Upon firing, unijunction transistor Q1 conducts causing a positive-going signal to be coupled to the base circuit of normally conducting transistor Q2 causing it to shut off. During the normal conducting condition of transistor Q2 a positive-going signal is coupled through capacitor 152 to the base of transistor Q3 causing it to be shut off, but upon shut off of transistor Q2, ground is coupled through capacitor 152 to the base of transistor Q3 which causes it to conduct. An output trigger signal is then taken from the top of resistor 157 in the collector circuit of transistor Q3 and coupled through capacitor 175 to the anode circuit of four-layer diode 172.

In the above described operation, interval register 15 operates in its step 20 wherein core C1 operates for a measured time period according to the time required to charge capacitor 139 through the circuit including variable resistor 50 to a positive level sufficient to fire unijunction transistor Q1. It is at the termination of such measured time interval that transistors Q1, Q2 and Q3 operate as described supra in order to provide a trigger signal which is applied to the anode circuit of four-layer diode 172.

The presence of the trigger signal at the anode circuit of four-layer diode 172 causes it to conduct which permits capacitor 174 (now charged) to be discharged through four-layer diode 172 and through the apertures of cores C11 and C12. With core C11 now in its set condition, the cathode circuit of four-layer diode 163 is made sufficiently negative so as to cause four-layer diode 163 to conduct. With four-layer diode 163 conductive, capacitor 180 (now charged) is discharged through its discharging circuit including minor apertures 100–109 of cores C1–C10, the major apertures of odd-positioned cores C1, C3 etc., four-layer diode 163, diode 164 and the apertures of cores C11 and C12. In this operation, energy is coupled from transmitting minor aperture 100 of core C1, over wire 130, to receiving minor aperture 91 of core C2 for setting core C2. Core C1 being cleared by the discharging of capacitor 180 interrupts its readout signal to interval amplifier 30 which interrupts its output to signal control circuit 10 and timing circuit 42. In addition, core C11 is cleared, while core C12 is set by the discharge of capacitor 180.

With core C2 being set, a readout signal is derived at its minor aperture 121 and coupled to its interval amplifier 31 for operating such interval amplifier 31 for a measured time interval as determined by the length of time required to charge capacitor 139 through its charging circuit including variable resistor 51 to the firing level of transistor Q1 for again firing transistor Q1. During this measured time interval, the output of interval amplifier 31 is applied over wire *b* to signal control circuit 10 through matrix selection 40 to control the vehicle and pedestrian signals as, for example, described with reference to FIG. 1C. Upon firing of transistor Q1, transistors Q2 and Q3 operate as described supra for again providing a trigger signal output which is coupled to the anode circuit of four-layer diode 172 through capacitor 175.

Bistable advance driver 60 operates in response to a received trigger signal from timing circuit 42 to provide its ADVANCE EVEN output for advancing interval register 15 to its next step 22. More specifically, four-layer diode 172 is rendered conductive upon application of the trigger signal from timing circuit 42 for discharging capacitor 174 through its discharge circuit including four-layer diode 172 and the apertures of cores C11 and C12. Core C12 now in its set condition operates to provide an output to the cathode circuit of four-layer diode 167 through the circuit including diode 168 and resistor 169. Capacitor 180 after having been discharged as described supra is charged through its charging circuit described supra. In this charging action, minor aperture 101 of core C2 is primed. Upon discharge of capacitor 180, core C2 is cleared causing transfer of operation from core C2 to core C3 in that a set signal is coupled from minor aperture 101 of core C2 to minor aperture 92 of core C3. Core C3 then operates for a measured time interval according to the value of its associated variable resistor 52 during which the output of interval amplifier 32 is applied over wire *c* to signal control circuit 10 through matrix selection 40 to operate the traffic and pedestrian signals as described supra, for example, with reference to FIG. 1C.

The description provided above is suggestive that interval register 15 further operates in a cyclic manner through its different steps 23–28 in each of which the corresponding cores C4–C9 operate in the manner described for cores C1–C3. In each case, the measured time intervals for these steps 23–28 depend upon the values of variable resistors 53–58 respectively, each of which measures the time interval required to charge capacitor 139 to a level sufficient to fire unijunction transistor Q1 in the manner described supra. In each case, the traffic and pedestrian signals are controlled in the manner described, for example, with reference to the chart illustrated in FIG. 1C.

Step 29 of interval register 15 is employed in the present example to control the traffic signals and pedestrian signals to display the same indication as are displayed for step 20 of interval register 15. However, interval register 15 operates only briefly in its step 29 in that no variable resistor is provided for coupling the output of interval amplifier 39 to capacitor 139 in the emitter circuit E of unijunction transistor Q1.

Upon operation of interval register 15 in its step 29, an output is taken from the output of interval amplifier 39 which is coupled to reset driver 63. More specifically, the output of interval amplifier 39 is applied to one terminal of four-layer diode 205 through coupling capacitor 220 causing four-layer diode 205 to be conducted. A positive-going signal is coupled through the major apertures of cores C2–C10 and minor apertures 111 of core C1 during the time that four-layer diode 205 is conductive for clearing all cores except core C1 which is set. In this manner, operation is transferred to step 20 wherein core C1 is set. This manner of operation using reset driver 63 obviates the possibility of having more than one of the cores C1–C10 operating at the same time in that for each cycle of operation all cores are cleared except core C1 which is set.

Should reset driver 63 malfunction for some reason, transfer loop 61 which couples minor apertures 109 of core C10 to minor aperture 90 of core C1 functions to transfer operation from core C10 to core C1. It is thus assured that transference of operation takes place between core C10 and core C1 upon completion of each cycle of operation of the cores C1–C10.

During the operation of interval register 15 in any one of its different steps 20–29, transistor Q5 of operate sensing circuit 66 is rendered conductive in that a positive-going signal is taken from the top of resistor 67 and applied over wire 68 to the base of transistor Q5. As long as transistor Q5 is conductive, diode 208 in reset driver 63 is back-biased. However, should interval register 15 fail to operate in any one of its steps 21–29 as caused, for example, by a malfunction when operation is transferred to such step, ground is coupled through resistor 67 and over wire 68 to the base of transistor Q5 in operate sensing circuit 66 causing it to cut off. Diode 208 in reset driver 63 is then forward-biased which permits (+) energy to be coupled to the anode circuit of four-layer diode 205 causing it to conduct. Capacitor 200 (now charged) is discharged through four-layer diode 205 and through major apertures 81–89 of cores C2–C10 respectively for clearing these cores C2–C10 and minor aperture 111 of core C1 for setting core C1. The operation of core C1 causes the proceed indication for phase A to be provided as described with reference to FIG. 1C in response to any malfunction such as described. It should be understood, however, that reset driver 63 could be effective to operate any other step of interval register 15 other than its step 20 merely by changing the coupling of the RESET wire to cores C1–C10 as is apparent from the detailed circuits of FIGS. 2A and 2B.

A malfunction could conceivably occur in the controller of the present invention during the operation of interval register 15 in one of its steps. For example, interval register 15 may malfunction while operating in its step 22 in which core C3 operates to the extent that the PNP transistor included in interval amplifier 32 becomes open. During the proper operation of such transistor, however, capacitor 139 in timing circuit 42 may be at least partially charged. In order that timing circuit 42 be effective to properly measure a predetermined time interval for other operative steps of interval register 15, capacitor 139 is discharged in response to each detected malfunction. In the absence of an output from interval amplifier 32, operate sensing circuit 66 becomes effective to operate reset driver 63 for rendering four-layer diode 205 conductive to reset interval register 15 to an operating condition where core C1 is set and each of the cores C2–C10 is cleared. While this operation occurs, capacitor 139 is discharged through the circuit including diode 137, capacitor 179 and resistor 178 in bistable advance driver 60. Thus, capacitor 139 is completely discharged upon return of operation of interval register 15 to its step 20 in which core C1 operates for a measured time interval.

CIRCUIT DESCRIPTION—FIGURE 4

In FIG. 4, particular circuits are illustrated for operating the traffic signals SA and SB and the pedestrian signals SP1 and SP2 in response to the operation of interval register 15. More specifically, and referring to FIG. 4, matrix selection 40 includes at least one diode for connecting each of the wires *a–h* to signal control circuit 10. One possible sequence of signal control for a signal cycle as defined by the cyclic operation of interval register 15 through its steps 20–29 as described supra with respect to FIG. 1C.

In order that the sequence of signal control illustrated in FIG. 1C be effective, the present invention provides in signal control circuit 10 six relays which are controlled in combination to provide a different combination of indications for each of these steps 20–29 of interval register 15. More specifically, phase A green relay AGR is responsive to the operation of interval register 15 in its steps 20, 21, 22 and 29. The outputs of these steps appearing on wires *a*, *b*, *c* and *h* are coupled respectively through diodes 223, 224, 225 and 226 and through amplifier 227 of relay AGR. Phase A pedestrian relay APR is responsive to interval register 15 when operating in its respective steps 20, 21, 22 and 29. More specifically, the outputs from these steps are coupled to relay APR through diodes 223–226 and through amplifier 229 for operating relay APR. Phase A-phase B green-yellow relay ABGY is controlled when interval register 15 operates in its respective steps 22 and 28. The outputs of these steps are coupled to relay ABGY through diodes 231 and 232 and through an amplifier 233. A phase B green relay BGR is controlled when interval register 15 operates in each of its steps 24–27. The outputs of these steps are coupled over wires *d–g* through diodes 235, 236, 237 and 238 and through amplifier 240 for controlling relay BGR. A phase B pedestrian relay BPR is controlled when interval register 15 operates in its steps 24 and 25. The outputs from these steps are coupled respectively over wires *d–g* through diodes 235–238 and through an amplifier 242. A pedestrian clearance relay PCR is controlled when interval register 15 operates in its steps 21, 22, 26 and 27. The outputs from interval register 15 when operating in these respective steps are coupled over respective wires *b*, *c*, *f* and *g* through diodes 244, 245, 246 and 247 and through an amplifier 248 to control relay PCR.

It is noted that for any one of the steps 20–22, 24–27 and 29, at least two of the six relays are controlled for causing a distinctive combination of vehicle and pedestrian signal indications to be displayed. For example, while interval register 15 operates in its step 20, relays AGR and APR are controlled to picked up conditions in that the output of interval amplifier 30 corresponding to step 20 of interval register 15 couples its output over wire *a* and through diode 223 of relays AGR and APR through corresponding amplifiers 227 and 229. In the picked up condition of relay AGR, the green lamp G for signal SA is controlled by a circuit including front contact 250 of relay AGR and back contact 251 of relay ABGY. In the dropped away condition of relay BGR, a circuit is completed including back contact 253 of relay BGR for energizing the red lamp R of signal SB. In the picked up condition of relay APR, a circuit is completed including front contact 255 of relay APR and back contact 256 of relay PCR for energizing the WALK display of pedestrian signal SP1. In addition, a circuit is completed including back contact 257 of relay BPR for energizing the DONT WALK display for pedestrian signal SP2. Other circuits may be readily traced for the different steps of interval register 15 and according to the signal sequence chart shown in FIG. 1C.

It is suggested in FIG. 1C that step No. 2 is the phase A pedestrian clearance step while step No. 7 is the phase B pedestrian clearance step. For each such step, the pedestrian clearance relay PCR is picked up which initiates a circuit for causing the respective DONT WALK signal for pedestrian signal SP1 or SP2 to operate in a flashing manner. More specifically, a motor M is energized through front contact 258 of relay PCR as long as relay PCR is picked up. Motor M then operates to control a cam 259 for opening and closing a contact 264. Each closure of contact 264 completes a circuit also including front contact 258 of relay PCR and either contact 257 of relay BPR or contact 266 of relay APR for momentarily energizing the corresponding DONT WALK lamp of signal SP1 or SP2. If, for example, it is assumed that interval register 15 is operating in step 26 wherein core C7 is operating, relays BPR and BCR are picked up. A circuit is then completed periodically according to operation of cam 259 and the closure of contact 264 for energizing the DONT WALK signal of pedestrian signal SP2 in a flashing manner.

CIRCUIT DESCRIPTION OF AMPLIFIER—FIGURE 5

FIG. 5 shows a detailed circuit for a typical amplifier which may be employed for each of the amplifiers 227, 229, 233, 240, 242 and 248 shown in block form in FIG. 4. More specifically, the typical amplifier includes a NPN type transistor Q8 which has its base connected to an INPUT TERMINAL through a biasing circuit including resistors 260 and 261. The INPUT TERMINAL is coupled selectively through diodes to one or more of the wires *a–h* as shown, for example, in FIG. 4. The emitter of transistor Q8 is connected to a biasing circuit including resistor 262 and diode 263. The collector of transistor Q8 is connected to an OUTPUT TERMINAL to which is coupled the winding of one of the six relays shown in signal control circuit 10 of FIG. 4.

EMBODIMENT AS A SEMI-ACTUATED TRAFFIC SIGNAL CONTROLLER—FIGURES 6A AND 6B

In describing the invention herein as embodied in the form of a semi-actuated traffic signal controller, reference is made to FIGS. 6A and 6B and with reference to the description provided supra. In semi-actuation control, the traffic signal controller controls the vehicle and pedestrian signals at the intersection in response to vehicle calls or pedestrian calls on at least one phase of the intersection. With respect to vehicle detection, it is common practice to locate vehicle detection means in the approach to the intersection so as to detect all vehicles on that approach before they reach the intersection. The vehicle detection apparatus takes many forms including electromagnetic, light, infrared, ultrasonic etc., but in each form it is usual to operate a device such as a relay for each vehicle which is detected by the vehicle detection apparatus. Such a relay is indicated in FIG. 6A and designated VRB for phase B. It should be understood that other such relays are provided as are required.

With respect to pedestrian calls, a manual push button is usually provided and located near the intersection so that it may be actuated by pedestrians when desiring to cross the non-actuated phase at the intersection. In FIG. 6B, such a button is indicated and designated PBB for phase B. It should be understood that more pedestrian call buttons such as PBB may be provided as required.

Referring now to FIGS. 6A and 6B, an interval register 265 is illustrated in block form similar to interval register 15 in that it includes steps 20–29 numbered 1–10. In addition, interval register 265 includes step 267 positioned between steps 20 and 21 and numbered 1A, while additionally including step 268 positioned between steps 24 and 26 and numbered 5A.

Step 267 of interval register 265 is included where isolated control of a traffic signal is desired for semi-actuated operation of the traffic signal controller. Step 268 of interval register 265 is included to provide a separate WALK interval for phase B where a pedestrian call occurs on phase B. In this connection, steps 25 and 26 are reversed in position so that step 26 occurs first in that it is the phase B pedestrian clearance step as described with reference to interval register 15 and the signal control sequence chart of FIGURE 1C. In the absence of a pedestrian call and presence of a vehicle call on phase B, interval register 265 may operate from its step 24 directly to its step 25 over transfer circuit 270 electronically skipping steps 26 and 268.

Each vehicle detection causing relay VRB to pick up operates a vehicle memory flip-flop 272 from its normal operating condition to an abnormal storage condition until reset. In addition, the pick up of relay VRB completes through its front contact 273 a charging circuit for a capacitor 274 through a resistor 275. While interval register 265 operates in its step 25, timing circuit 42 is reset to a zero timing condition upon detection of each vehicle in phase B. In the absence of vehicles on phase B, timing circuit 42 is permitted to time out a minimum interval for advancing interval register 265 to its next step 27. To assure that capacitor 274 is discharged prior to detection of each vehicle on phase B, its discharge circuit is completed through back contact 273 of vehicle relay VRB.

Each actuation of pedestrian push button PBB causes a pedestrian memory flip-flop 277 to operate from its normal operating condition to an abnormal storage condition until reset. A WALK driver circuit 278 is responsive to pedestrian memory flip-flop 277 when storing a pedestrian call for resetting bistable advance driver 60 and the different steps of interval register 265 in the manner described supra for interval register 15.

A maximum timer 280 similar to timing circuit 42 as described with reference to FIG. 2A is employed to measure a minimum time interval that interval register 265 operates in its step 20 as determined by the setting of variable resistor 282. In addition, a maximum time interval is measured for step 25 of interval register 265 for phase B for limiting the number of vehicles permitted to enter the intersection from phase B. By means of a switch 283, one of two variable resistors 284 and 285 can be selected each effective to set a different time interval for step 25 of interval register 265.

It is contemplated that the semi-actuated controller of FIGS. 6A and 6B is operable in either isolated or coordinated control. In this connection, switches 287 and 288 are provided for selectively connecting the controller for either isolated or coordinated control. Switch 287 in its isolated control position as illustrated permits the maximum timer to operate for isolated control. That is, it permits maximum timer 280 to be responsive to the operation of interval register 265 in its steps 20 and 25 according to the variable resistor selected for these respective steps. Switch 288 in its isolated control position as illustrated isolates the circuits employing the offset and split signals. For isolated control, the output of step 267 of interval register 265 is coupled through its interval amplifier 289 and resistor 290 to trigger circuit 77 provided either a pedestrian call or vehicle call is coupled through respective diodes 292 and 293 to back-bias diode 294.

In the coordinated control positions of switches 287 and 288, the traffic signal controller of FIGS. 6A and 6B is responsive to offset and split signals received from a central location according to pedestrian and/or vehicle calls. Switch 287 in its coordinated control position couples ground to maximum timer 280 and, more specifically, to the emitter E circuit of transistor Q1, for example, for preventing firing of such transistor. Switch 288 in its coordinated control position couples the output of step 20 to trigger circuit 77 only upon reception of an offset signal, while the output of step 25 of interval register 265 is coupled to trigger circuit 77 through switch 288 only upon reception of a split signal.

In operating the traffic signal controller of FIGS. 6A and 6B for either coordinated control or isolated control, a reset circuit 296 is provided for the purpose of resetting timing circuit 42 to a zero timing condition upon detection of each vehicle of a plurality of closely-spaced vehicles appearing on phase B. More specifically, in step 25 of interval register 265, a vehicle extension time period is measured by the setting of resistor 55 through which the output of interval amplifier 25 is coupled to timing circuit 42. It is contemplated that such time interval measured by variable resistor 55 is of a duration such that the detected vehicle on phase B has sufficient time to proceed through the intersection. This time interval may be in the order to three to fifteen seconds. In order that interval register 265 continues to operate in its step 25 for a plurality of closely-spaced vehicles on phase B, reset circuit 296 is activated by the output of AND gate 297 which receives one of its inputs from interval amplifier 35 and its other input from the top side of resistor 275. Resistor 275 being connected in the charging circuit of capacitor 274 supplies a (+) energy input to AND gate 297 for each vehicle detected on phase B which causes capacitor 274 to charge. It is only when no further vehicles are detected on phase B that the timing interval as set by variable resistor 55 is measured for step 25 causing timing circuit 42 to provide a trigger signal output for the purpose of advancing interval register 265 to its next step 27.

OPERATION—FIGURES 6A AND 6B

In considering the operation of the traffc signal controller illustrated in FIGS. 6A and 6B, it is first assumed that switches 287 and 288 are in their isolated control positions for permitting isolated control at the intersection.

Initially, interval register 265 operates in its step 20 for a minimum time interval measured by the setting of variable resistor 282. The output of step 20 after amplification by its corresponding interval amplifier 30 is coupled through resistor 282, diode 298 and resistor 299 to the input of maximum timer 280. Upon termination of the measured time interval for step 20, maximum timer 280 provides a trigger signal output which is coupled to bistable advance driver 60 for operating it in the manner described supra for advancing interval register 265 to its next step 267. Interval register 265 then operates in its step 267 until a pedestrian call or vehicle call occurs on phase B.

During the time that interval register 265 operates in its step 267, an output is taken from its corresponding interval amplifier 289 and applied over wire *j* through matrix selection 40 to signal control circuit 10 for operating the traffic and pedestrian signals similar to the operation in step 20 of interval register 265 as described supra. In this connection, the traffic signals are controlled to provide a continuous proceed indication to traffic on phase A.

Where at least a first vehicle call occurs on phase B, vehicle memory flip-flop 272 is operated to its abnormal storage condition in that relay VRB is picked up momentarily which causes flip-flop 272 to provide a vehicle storage output which is coupled through diode 293 to diode 294 for back-biasing such diode. Normally, diode 294 is forward-biased in that ground is coupled thereto through resistor 295. The output of step 267 is coupled through its interval amplifier 289 to trigger circuit 77 through resistor 290 to cause trigger circuit 77 to provide an output to timing circuit 42 for causing timing circuit 42 to provide its trigger signal output to bistable advance driver 60 as described with reference to FIG. 2A for advancing interval register 265 to its next step 21.

According to the settings of variable resistors 51–54, interval register 265 operates for measured time intervals in its steps 21–24 in the manner described supra. In each such step, the vehicle and pedestrian signals are controlled in distinctive combinations as suggested above. Upon measurement of the time interval for step 24 of interval register 265, interval register 265 is advanced to its step 25 thereby bypassing steps 268 and 26 inasmuch as it is now assumed no pedestrian call is stored by pedestrain memory flip-flop 277.

Interval register 265 upon operating to its step 25 continues to operate therein depending upon the number of vehicles detected and the frequency of detection thereof at least until a maximum time interval is measured as set on the selected resistor 284 or selected resistor 285. In this connection, resistors 284 and 285 are provided such that different maximum time intervals may be set as desired. A time interval for one vehicle to traverse the intersection is set on variable resistor 55 which couples the output of interval amplifier 35 corresponding to step 25 to timing circuit 42. The occurrence of closely-spaced vehicles on phase B and detection thereof, however, causes reset circuit 296 to be recurrently effective to reset timing circuit 42 to a zero timing condition. In this connection, the charging of capacitor 274 upon pick up of detection relay VRB causes a (+) energy input to be supplied to AND gate 297 which they provides its output to reset circuit 296 for activating such circuit. In the presence of a sufficient gap between detected vehicles which is greater than the time interval measured by the setting of resistor 55, timing circuit 42 measures the entire timing interval for a single vehicle causing it to provide its trigger signal output which is coupled to bistable advance driver 60 for advancing interval register 265 to its step 27. If, however, a sufficient number of closely-spaced vehicles are detected on phase B, the maximum time interval is measured causing maximum timer 280 to be operated for providing a trigger signal output to advance bistable driver 60.

Interval register 265 operates in its steps 27 and 28 for measured time intervals as set by variable resistors 57 and 58 respectively. The vehicle and pedestrian signals are controlled, for example, in the combinations described supra for these steps 27 and 28. At the termination of the time interval measured during the operation of interval register 265 in its step 28, interval register 265 advances to its step 21 wherein it remains briefly before advancing to step 20 as described above.

If, instead of a vehicle call, a pedestrian call is stored in pedestrian memory flip-flop 277, steps 268 and 26 of interval register 265 are operated in sequence following the operation of interval register 265 in its step 24. Initially, interval register 265 is operated from its step 267 in that the stored pedestrian call signal is applied through diode 292 to back bias diode 294 permitting trigger circuit 77 to be responsive to the output of step 267 for coupling a trigger signal to bistable advance driver 60. At the termination of the time interval measured for step 24 of interval register 265, walk driver 278 concurrently receives inputs from step 24 and pedestrian memory flip-flop 277 causing it to provide an output which is coupled to bistable advance driver 60 for advancing operation of interval register 265 to its step 268. In this connection, bistable advance driver 60 supplies are set signal to the steps of interval register 265 which is coupled through major apertures of cores included with all steps except step 268 for clearing such cores and is further coupled through a minor receiving aperture of the core included with step 268 for setting such core in the manner described with reference to FIGS. 2A and 2B. In this manner, step 268 is operated only where a pedestrian call is stored by pedestrian memory flip-flop 277. Interval register 265 operates in its step 268 for a time interval as measured by the setting of variable resistor 301 and its output is coupled from its associated interval amplifier 302 over wire *k'* to timing circuit 42 through variable resistor 301.

Interval register 265, upon termination of its operation in step 268, is advanced in the normal manner to its step 26 wherein it operates for a measured time interval as determined by the setting of resistor 56. In step 26, the vehicle and pedestrian signals are controlled in a combination including a proceed vehicle signal for phase B and a flashing DONT WALK signal for phase B. Interval register 265 then operates in the manner described through its remaining step 25, 27–29 and 20 to its step 267 wherein it remains until a vehicle call or pedestrian call occurs.

In coordinated control, and with switches 287 and 288 in their coordinated control positions, the traffic signal controller of FIGS. 6A and 6B also is responsive to received offset and split signals. More particularly, maximum timer 280 having ground coupled thereto through switch 287 is rendered ineffective. That is, ground may be coupled through switch 287, for example, to the timing capacitor discharge circuit to prevent timing thereby. Switch 288 being in its coordinated control position couples the outputs of steps 20 and 25 to trigger circuit 77 only in the presence of respective offset and split signals. When operating in step 20, interval register 265 continues to operate therein until an offset signal is received from the remote location to cause diode 76 to be back-biased. The output of step 20 then is coupled through its interval amplifier 30 and resistor 75 to trigger circuit 77 through OR gate 74 causing an output to be coupled to timing circuit 42. Timing circuit 42 then provides its trigger signal output which is coupled to bistable advance driver 60 for advancing interval register 265 to its step 267. In the presence of a vehicle call or pedestrian call on phase B, interval register 265 is immediately advanced to step 21 in that trigger circuit 77 becomes immediately effective to provide a trigger signal to bistable advance driver 60 for advancing interval register 265. In the operation of interval register 265 in its step 25 as described supra, vehicle extension time periods are provided according to the detection of successive vehicles with a maximum timing also set according to the selection of either resistor 284 or resistor 285. The occurrence of a split signal causes diode 79 to be back-biased, however, which causes trigger circuit 77 to provide a trigger signal output which is coupled to bistable advance driver 60 to operate interval register 265 to its next step 27. The operation of interval register 265 for its other steps is as described supra.

In the operation described supra, vehicle memory flip-flop 272 is reset to its normal condition upon operation of interval register 265 in its step 25 as AND gate 300 concurrently receives an input from timing circuit 42. Pedestrian memory flip-flop is reset to a normal condition when interval register 265, operates in its step 26.

DESCRIPTION OF MEMORY FLIP-FLOP—FIGURE 7

FIG. 7 illustrates a typical memory flip-flop which may be employed by either the vehicle memory flip-flop 272 or pedestrian memory flip-flop 277. Referring to FIG. 7, the memory flip-flop includes two PNP transistors Q9 and Q10. The base of transistor Q9 is coupled to (+) energy through a resistor 303 and further coupled through a diode 304 to a circuit including resistor 305 and capacitor 306 which is connected to a CANCEL TERMINAL. The base of transistor Q9 is further coupled to the collector of transistor Q10 through resistor 308. The emitters of transistors Q9 and Q10 are coupled to (+) energy through resistor 309. The base of transistor Q10 is coupled to (+) energy through a resistor 310 and also to an INPUT TERMINAL. The base of transistor Q10 is further coupled to the collector of transistor Q9 through a resistor 312. The collectors of transistors Q9 and Q10 are coupled respectively through resistors 313 and 314 to ground. An output is taken from the collector circuit of transistor Q9 and applied to a MEMORY STORAGE TERMINAL to which is coupled the input of a circuit such as for example walk driver 278.

In operation, normally conducting transistor Q10 is rendered non-conductive by a positive-going input as caused by either a pedestrian call or vehicle call. When transistor Q10 cuts off, the base of transistor Q9 is biased to a negative (—) potential causing transistor Q9 to become conductive. A positive-going signal is taken from the top of resistor 313 and coupled to the MEMORY STORAGE TERMINAL. The memory flip-flop is reset upon application of the positive-going signal to its CANCEL TERMINAL which is coupled through capacitor 306 and diode 304 to the base of transistor Q9 cutting it off and causing the base of transistor Q10 to be biased to a negative (—) potential turning it on.

In the description of the semi-actuated controller, interval register 265 remains in its step 267 until a vehicle call or pedestrian call occurs. It is intended that the controller of the present invention be responsive to permissive period signals for causing the controller to operate from its dwell step 267 of interval register 265. In brief, it is well known that for coordinated operation of traffic signal controllers, a portion of the control cycle is allotted to each of the phases. With respect to the actuated phase, a permissive period signal is transmitted during which a vehicle call or pedestrian call on the actuated phase may be utilized in the controller to operate the interval register through its steps for displaying appropriate indications to the actuated phase having the call. FIG. 8 illustrates in partial block diagram form a modification of the traffic signal controller embodiment shown in FIGS. 6A and 6B for utilizing the well-known permissive period signals as transmitted from a remote control station.

DESCRIPTION OF MODIFIED CONTROLLER—FIGURE 8

Referring now to FIG. 8, interval register 265 is partially shown to include its steps 20, 267, 21 and 29 with a dotted line 317 positioned between steps 21 and 29 for indicating that the other steps shown in FIGS. 6A and 6B for interval register 265 would be normally included. Interval register 265 also includes steps 318 and 319 numbered 1B and 1C respectively. Each of steps 318, 319 and 29 has its output when operating coupled to interval amplifier 39 for controlling the vehicle and pedestrian signals to display a proceed indication for phase A and a pedestrian WALK indication also for phase A.

In the presence of the vehicle call or pedestrian call, interval register 265 is operated from its step 267 in that diode 294 is back-biased which permits the output from step 267 to be coupled through its interval amplifier 289 and through resistor 290 to trigger circuit 77 as described supra. Interval register 265 then operates quickly into step 318.

Phase B driver 321 is responsive to pedestrian memory flip-flop 277 or vehicle memory flip-flop 272 in their storage conditions as well as step 318 of interval register 265 when operating for providing a reset signal output. In this connection, the simultaneous presence of an output from step 318 of interval register 265 and a vehicle or pedestrian call storage signal output causes phase B driver 321 to provide a reset output over wire 65 to bistable advance driver 60 for clearing all steps of interval register 265 except the phase A pedestrian clearance step 21 which it sets in the manner described with reference to FIGS. 2A and 2B. Interval register 265 then operates through its remaining steps as described with reference to FIGS. 6A and 6B in the manner described supra.

In the absence of a vehicle call or pedestrian call, interval register 265 is advanced from its step 267 upon the occurrence of a permissive period signal. More specifically, a diode 325 is normally coupled to ground (absence of permissive period signal) causing it to be forward-biased permitting the output of step 267 to be coupled through its interval amplifier 289 and resistor 326 to ground. However, upon occurrence of the permissive period signal, diode 325 is back-biased permitting the output of step 267 to be coupled through interval amplifier 289 and resistor 326 to trigger circuit 77 through OR circuit 327 and switch 288 in its coordinated control position. A trigger signal is then coupled to bistable advance driver 60 for advancing interval register 265 to its next step 318. Interval register 265 operates quickly through its steps 318 and 319 since no variable is included in the connection of interval amplifier 39 to timing circuit 42 and there is no vehicle call or pedestrian call to trigger phase B driver 321. From step 319, operation is returned to step 20 over transfer wire 328. Interval register 265 operates in its step 20 for a measured time interval at the termination of which it is operated to its step 267 wherein it dwells until the permissive period signal again arrives.

EMBODIMENT AS A FULLY-ACTUATED TRAFFIC SIGNAL CONTROLLER—FIGURES 9A–9C

In describing the invention herein as embodied in the form of a fully-actuated traffic signal controller, reference is made to FIGS. 9A, 9B and 9C and with reference to the description provided supra. In full-actuation control, the traffic signal controller controls the vehicle and pedestrian signals at the intersection in response to vehicle calls or pedestrian calls on each phase of the intersection. With respect to vehicle detection, vehicle detection means is located in each approach to the intersection for each phase so as to detect all vehicles before they reach the intersection. In this connection, a vehicle detection relay VRA is illustrated for phase A, while a vehicle detection relay VRB is illustrated for phase B in FIGS. 9A and 9B respectively. It should be understood that other such relays are provided as are required.

With respect to pedestrian calls, a manual push botton is provided for each of phase A and phase B each of which may be actuated by pedestrians desiring to cross the associated phase at the intersection. In FIGS. 9A and 9B, a button for phase A designated PBA is illustrated and a button designated PBB for phase B is also illustrated. It should be understood that more pedestrian call buttons may be provided as required.

Referring now to FIGS. 9A, 9B and 9C, an interval register 330 is illustrated in block from similar to interval registers 15 and 265 in that it includes a plurality of steps coupled in similar fashion to the steps of the interval registers 15 and 265. Inasmuch as the embodiment of FIG. 9 is a fully-actuated controller, vehicle calls as well as pedestrian calls occur on each phase of the intersection, these being phase A and phase B. In order that the controller embodiment be operable for isolated control or coordinated control, interval register 330 includes steps numbered 1–18 and designated 335–352.

In the present embodiment, the steps 335–352 of interval register 330 are arranged in a sequence to control the traffic and pedestrian signals for phase A and phase B depending upon the vehicle calls or pedestrian calls as well as the type of control in which the controller is operating. In this connection, FIG. 9D shows a typical signal control sequence in which the principal signals controlled for the different steps Nos. 1–18 of the interval register 330 are shown. It is noted that many of the principal signals to be controlled are similar to signals controlled for the steps of interval registers 15 and 265 as described supra. In addition, other principal signals as well as the permissive period intervals are shown corresponding to other steps of interval register 330.

Each of the steps 335–352 of interval register 330 supplies its output to an amplifier, these interval amplifiers being numbered 1–18 and corresponding respectively to steps numbers 1–18 designated 335–352 of interval register 330. As mentioned previously, some of the steps 335–352 of interval register 330 correspond to steps of interval registers 15 and 265. In this connection, the interval amplifiers corresponding to these steps are coupled to timing circuit 42 through the variable resistors illustrated in FIGS. 1, 2 and 6. The steps of interval register 330 which correspond to steps illustrated for interval registers 15 and/or 265 include steps 335, 336, 340, 344, 345 and 347–350. For example, on step 340 of interval register 330, variable resistor 51 couples the output of interval amplifier 6 to timing circuit 42 for setting the time period during which interval register 330 operates in its step 340. Variable resistors 355 and 356 couple the respective outputs of interval amplifiers numbered 4 and 5 to timing circuit 42 for measuring the time periods that interval register 330 operates in the corresponding steps.

For each of phase A and phase B, a vehicle memory flip-flop is provided for storing a vehicle detection condition until reset, these flip-flops being designated 360 and 272. Vehicle memory flip-flop 360 is responsive to each vehicle detection on phase A as represented by the pick up of vehicle relay VRA causing the input circuit including front contact 361 of relay VRA, capacitor 362 and resistor 363 to control vehicle memory flip-flop 360 to a vehicle storage condition. Similarly, vehicle memory flip-flop 272 is controlled to a vehicle storage condition upon operation of relay VRB in the manner described above.

A pedestrian memory flip-flop is provided for each of phase A and phase B, these flip-flops being designated 365 and 277 respectively. Each of the flip-flops 365 and 277 is operable to store a pedestrian call as caused by the actuation of respective pedestrian buttons PBA and PBB until such flip-flop is reset to non-storage condition. It is noted that the vehicle memory flip-flop 360 and pedestrian memory flip-flop 365 are similar to the typical flip-flop circuit shown in FIG. 7.

In order that interval register 330 operate for only those steps which are required depending upon traffic demand, driver circuits 278, 367 and 368 are provided to operate interval register 330 through particular steps thereof depending upon the phase on which a vehicle call or pedestrian call is present. In this connection, drivers 278 and 368 are walk drivers respectively for phase B and phase A which are responsive to respective storages in pedestrian memory flip-flops 277 and 365. The driver 367 is a phase B driver and is responsive to storages in either the vehicle memory flip-flop 272 or pedestrian memory flip-flop 277 for phase B. It is noted that each such driver circuit is similar to the reset driver circuit shown in detail in FIG. 2B.

A vehicle gap timer 370 is provided for timing the vehicle extension time intervals during which interval register 330 operates on its steps 341 and 350, these steps being respectively the phase A vehicle final green interval and phase B vehicle final green interval. Each of steps 341 and 350 is coupled to vehicle gap timer through a variable resistor, these resistors being designated 372 and 373. A reset circuit 375 is provided for resetting vehicle gap timer 370 to a zero timing condition according to the successive detection of closely-spaced vehicles on the phase for which a proceed indication is displayed as controlled by interval register 330 on a particular step thereof. Each of steps 342 and 351 is also coupled to vehicle gap timer 370 through respective resistors 372 and 373, these steps being respectively allotted to phase B permissive period and phase A permissive period.

OPERATION FIGURES 9A–9C

The traffic signal controller of FIGS. 9A, 9B and 9C is operable in either isolated control or coordinated control. In this respect, switches 287 and 288 are illustrated in FIG. 9A in their positions for permitting coordinated control of the traffic signal controller. Manual operation of such switches 287 and 288 to their isolated control positions permits the traffic signal controller to operate for isolated control where only the vehicle calls or pedestrian calls are effective to operate interval register 330 through required steps for appropriately controlling the traffic and pedestrian signals.

Irrespective of the positions of switches 287 and 288, the traffic signal controller initially operates upon application of energy to advance interval register 330 through its steps 335–337 and cyclically through its steps 338 and 341–343 until a call occurs on either phase A or phase B or an appropriate background control signal is received from the control station. More specifically, upon application of energy to the traffic signal controller circuits, step 335 is initially operated in that the core thereof is initially set upon charging of capacitor 174 as described above with reference to FIG. 2A. Interval register 330 operates in its step 335 at the termination of which circuit 42 provides its trigger signal output to bistable advance driver 60. Bistable advance driver 60 then operates to discharge capacitor 174 as described supra to cause transfer of operation to step 336 of interval register 330 as the ADVANCE ODD signal is coupled to step 335 of interval register 330. Interval register 330 then operates sequentially through its steps 336 and 337 to step 338. It is noted that no variable resistor is included in the circuit coupling amplifier number 3 to timing circuit 42 which permits interval register 330 to quickly advance from step 337 to step 338.

In the absence of a stored pedestrian call as determined by the operation of flip-flop 365 to a storage condition, interval register 330 operates in its step 338 for a time interval measured by the setting of resistor 355. Upon termination of such measured time interval, timing circuit 42 produces a trigger signal output which is coupled to bistable advance driver 60 causing it to provide its ADVANCE EVEN output for advancing interval register 330 to step 341. In this connection, upon operation of step 338, an output is taken from its corresponding amplifier No. 4 and coupled to walk driver 368 for activating such driver 368 only if it concurrently receives a pedestrian call storage from flip-flop 365. As shown in the chart of FIG. 9B, step 341 corresponds to the phase A vehicle final green interval in which a proceed indication is provided for phase A and a red or stop indication provided for phase B.

Interval register 330 operates in step 341 for a maximum time interval as determined by the setting of resistor 282. Upon termination of the maximum time interval, maximum timer 280 operates to provide a trigger signal output to bistable advance driver 60 for advancing interval register 330 to its step 342. However, interval register 330 quickly operates through its steps 342 and 343 whereupon operation is transferred to step 338 over wire 378. In this connection, the output of step 342 is coupled to trigger circuit 77 through OR gate 379 and switch 288, while the output of step 343 is coupled directly to timing circuit 42. In the absence of a pedestrian call on phase A or a vehicle or pedestrian call on phase B, interval register 330 cyclically operates through the steps 338 and 341–343.

Let it be assumed that a pedestrian call occurs on phase A. In this connection, button PBA is actuated by a pedestrian to supply (+) energy to pedestrian memory flip-flop 365 causing it to operate to a storage condition. In response to such pedestrian call, interval register 330 operates to control the pedestrian traffic signal for phase A to display a WALK indication for a predetermined time interval.

The pedestrian storage signal output of flip-flop 365 is coupled to walk driver 368 causing walk driver 368 to provide a reset output upon operation of step 338 which is coupled to steps 335–352 of interval register 330 for clearing all steps except step 339 which it sets and for resetting bistable advance driver 60 to the condition wherein core C11 is set and core C12 is cleared (see FIG. 2A). Interval register 330 then operates in its step 339 for a time interval measured by the setting of resistor 356. During the measured time interval, the output of amplifier No. 5 is also coupled over wire *l* to signal control circuit 10 through matrix selection 40 for controlling the pedestrian signal SP1 to display a WALK indication, while additionally controlling the traffic signal SA to display a green or proceed indication and traffic signal SB to display a red or stop indication.

Upon termination of the measured time interval for step 339 of interval register 330, timing circuit 42 couples its trigger signal output to bistable advance driver 60 causing it to provide its ADVANCE ODD output. The ADVANCE ODD output of bistable advance driver 60 is coupled through the odd-positioned steps including step 339 causing interval register 330 to transfer operation of its succeeding step 340. Interval register 330 operates in its step 340 for a measured time interval set by variable resistor 51 during which the output of amplifier No. 6 is coupled to signal control circuit 10 over wire *b* and through matrix selection 40 to operate pedestrian signal SP1 to provide a pedestrian clearance or DONT WALK indication. At the termination of the measured time interval for step 340, interval register 330 is again cycled through its steps 341–343 and 338.

If it is now assumed that a first vehicle is detected on phase A followed by the successive detection of other vehicles on phase A each of which causes relay VRA to pick up, interval register 330 continues to operate in its step 341 to provide control of the traffic signal SP1 causing it to continue to provide a proceed indication to traffic on phase A. More specifically, a timing interval is measured in step 341 of interval register 330 which is set by the setting of resistor 372 at the termination of which vehicle gap timer 370 provides an output which is employed to reset vehicle memory flip-flop 360. Such time interval is measured by vehicle gap timer 370 only if a sufficient gap or spacing exists between successive vehicles. If, however, the spacing of vehicles detected on phase A is close, vehicle gap timer 370 is reset to a zero timing condition for each detected vehicle. In this respect, upon pick up of relay VRA, capacitor 362 is charged through the circuit including front contact 361 of relay VRA and resistor 363. For each detected vehicle a postive-going signal is taken from the top side of resistor 363 and coupled to AND gate 380 to which the output of step 341 is also coupled concurrently for causing AND gate 380 to provide an output which is supplied to reset circuit 375 through an OR gate 381. Reset circuit 375 then is effective to reset vehicle gap timer 370 to a zero timing condition.

In the absence of vehicle detections on phase A following one or more detections of closely-spaced vehicles, vehicles gap timer 370 is permitted to electrically time the time interval as determined by the setting of resistor 372 causing vehicle gap timer 370 to provide its output. The output of vehicle gap timer 370 is coupled to vehicle memory flip-flop 360 through AND gate 382 which concurrently receives an input from step 341 of interval register 330 for resetting vehicle memory flip-flop 360 to a non-storage condition. During the storage condition of vehicle memory flip-flop 360, an output representing no gap is coupled to diode 383 for forward-biasing such diode 383. The output of step 341 is coupled through its amplifier No. 7, over wire 384, through resistor 385 and through diode 383 in its forward-biased condition to ground. However, upon resetting of vehicle memory flip-flop 360 to its non-storage condition, diode 383 is reverse biased by a gap output from such flip-flop 360 which permits the output from step 341 to be coupled through OR gate 386 to trigger circuit 77. Trigger circuit 77 couples its output to timing circuit 42 causing it to provide its trigger signal output to bistable advance trigger 60 for advancing interval register 330. Interval register 330 then operates from its step 341 in the absence of any further phase A or phase B vehicle calls or pedestrian calls and continuously recycles through steps 338 and 341–343. In this connection, the output of step 342 is coupled after amplification over wire 389 and through OR gate 379 and switch 288 to trigger circuit 77. Trigger circuit 77 then operates to provide its output to timing circuit 42 which effects the advancing of interval register 330 to its step 343. In step 343, the output thereof is directly coupled to timing circuit 42 over wire 377 for advancing interval register to its step 338 in the absence of any phase B vehicle or pedestrian calls. Traffic signals SP1 and SP2 are continuously controlled to provide respectively a proceed indication for phase A and a red or stop indication for phase B.

If it is assumed that a first vehicle followed by a plurality of closely-spaced vehicles on phase B are detected, interval register 330 then operates through particular ones of its steps for operating the traffic signals SP1 and SP2 to provide a proceed indication for phase B and a red or stop indication for phase A. More particularly, the first vehicle detected on phase B causes relay VRB to pick up causing (+) energy to be coupled to vehicle memory flip-flop 272 through front contact 273 of relay VRB for operating it to a vehicle storage condition. In the vehicle storage condition of vehicle memory flip-flop 272, a storage output is coupled to phase B driver 367 through the circuit including diode 293 and resistor 295. Phase B driver 367 is effective upon receiving an input from either step 342 or 343 when operating to provide a reset output which is coupled to all of the steps 335–352 of interval register 330 for clearing all steps except step 344 which it operates to a set condition and for setting single aperture core C11 and clearing core C12 in bistable advance driver 60. Interval register 330 then operates in its step 344 for a measured time interval as determined by the setting of resistor 52 during which time interval traffic signal SP1 is controlled to display an amber indication.

At the termination of the measured time interval for step 344 of interval register 330, it is advanced successively through its steps 345 and 346 to its step 347. In this connection, interval register 330 operates in its step 345 according to the setting of resistor 53, but is quickly advanced through step 346 inasmuch as no resistor is included in the connection of its output to timing circuit 42.

Step 347 of interval register 330 is a phase B vehicle initial green interval wherein the traffic signal SP2 is operated to display a proceed indication to traffic on phase B while traffic signal SP1 is operated to display a stop indication for phase A. Interval register 330 operates in its step 347 for a time interval measured by the setting of resistor 54 at the termination of which interval operation of interval register 330 is transferred to its step 350. In this connection, it is assumed that no pedestrian call is now present for phase B. In the absence of a pedestrian call for phase B, steps 348 and 349 are electronically skipped. As interval register 330 operates in its step 350, a maximum time interval is measured by the setting of variable resistor 284 through which the output of amplifier No. 16 is coupled over wire 387 to maximum timer 280.

The output of step 350 of interval register 330 after amplification by its amplifier No. 16 is also coupled to vehicle gap timer 370 over wire 388 and through variable resistor 373 to time a minimum time interval which may be referred to as a vehicle extension interval during which the detected vehicle is permitted to proceed through the intersection. Vehicle gap timer 370 is repeatedly reset to its zero timing condition if the detected vehicles are sufficiently closely-spaced such that the minimum extension time interval is not completely timed. In this connection, reset circuit 375 receives an input for each detected vehicle in that a positive (+) going signal is taken from the top side of resistor 275 and supplied to AND gate 391 concurrently with the output of amplifier No. 16 corresponding to step 350 causing its output to be supplied to reset circuit 375 over wire 392 and through OR gate 381. Reset circuit 375 is then effective to operate vehicle gap timer 370 to its zero timing condition for each detected vehicle. If the last vehicle is detected within the maximum time interval as measured by the setting of resistor 284, vehicle gap timer 370 is permitted to electronically time a complete vehicle extension time period causing it to provide an output which is coupled to vehicle memory flip-flop 272 over wire 394 and through AND gate 395. AND gate 395 concurrently receives an input from amplifier No. 16 corresponding to step 350 to permit it to provide a RESET output to vehicle memory flip-flop 272 for operating it to a non-storage condition.

Vehicle memory flip-flop 272 in its vehicle storage condition provides a no gap output which is coupled to diode 396 over wire 397 for forward-biasing such diode 396. The output of step 350 is coupled over wire 398, resistor 399 and through diode 396 in its forward-biased condition to ground. However, upon operation of vehicle memory flip-flop 272 to its non-storage condition, a gap output is coupled over wire 397 to reverse bias diode 396. The output of step 350 is coupled through OR gate 386 to trigger circuit 77 to cause trigger circuit 77 to provide its output to timing circuit 42. Timing circuit 42 then provides its trigger signal output to bistable advance driver 60 for advancing the interval register 330 from its step 350 to its step 351 in that it provides its ADVANCE EVEN output. During the time that interval register 330 operates in its step 350, traffic signal SP2 is controlled to display a proceed indication to phase B traffic and a stop indication to phase A traffic.

Interval register 330 quickly operates through its steps 351 and 352 prior to operating in step 347 again. In this connection, the output of step 351 is coupled over wire 400 and through OR gate 379 and switch 288 to trigger circuit 77. Trigger circuit 77 then operates to provide an output to timing circuit 42 for advancing interval register 330 to step 352. In step 352, the output thereof is coupled directly to timing circuit 42 over wire 401 for quickly advancing interval register 330 to its step 347. Interval register 330 continues to cycle through its steps 347 and 350–352 until a phase A vehicle call or phase A or phase B pedestrian call occurs.

If it is assumed that a pedestrian call occurs on phase B, pedestrian memory flip-flop 277 is operated to a storage condition which storage condition output is coupled to walk driver 278. Upon operation of interval register 330 in its step 347, an input from amplifier No. 13 corresponding to step 347 is coupled to walk driver 278 causing walk driver 278 to provide a reset output which is coupled to all of the steps 335–352 for clearing all steps except step 348 which it operates to a set condition and further resetting the cores in bistable advance driver 60. Interval register 330 then operates in its step 348 for a measured time interval as determined by the setting of resistor 301 during which the pedestrian signal SP2 for phase B is operated to display a WALK indication. At the termination of the measured time interval, interval register 330 is advanced to its step 349 wherein it operates for a measured time interval as determined by the setting of resistor 56 during which the pedestrian clearance of flashing DONT WALK indication for phase B is provided. In step 349, an output is taken at the output of amplifier No. 15 corresponding to step 349 and coupled to pedestrian memory flip-flop 277 for resetting such flip-flop 277 in its non-storage condition. In the absence of a vehicle storage for phase B, interval register 330 operates in its step 350 only for a brief interval. More specifically, an output from vehicle memory flip-flop 272 corresponding to vehicle absence or gap is coupled to diode 396 causing diode 396 to be back-biased. With diode 396 back-biased, the output of step 350 is coupled over wire 398, through resistor 399 and OR gate 386 to trigger circuit 77 causing trigger 77 to couple its output to timing circuit 42. Timing circuit 42 then couples its trigger signal output to bistable advance driver 60 which functions to advance interval register 330 to step 351. Interval register 330 then operates through its steps 351 and 352 as described above prior to recycling through steps 347 and 350–352 in the absence of a phase A vehicle call or a phase A or phase B pedestrian call.

If it is assumed that the traffic signal controller of FIGS. 9A, 9B and 9C is operated in response to coordinated control, switches 287 and 288 are positioned as illustrated in FIG. 9A. As described above, the positioning of switch 287 in its coordinated control position causes maximum timer 280 to be ineffective to measure a maximum time interval.

It has been described above how interval register 330 continuously recycles through particular steps for either of phase A or phase B depending upon the last phase having a vehicle or pedestrian call. It is only when a vehicle call or pedestrian occurs on the opposite phase that interval register 330 operates through the steps corresponding to that phase. Similarly, interval register 330 is operated through its steps during coordinated control in response to vehicle calls and/or pedestrian calls on phase A and phase B and further in response to the coordinating signals such as provided by the above-mentioned Auer et al. application Ser. No. 316,858. In particular, the communication system of the above-mentioned Auer et al. application may produce for example in sequence the offset signal, the phase B permissive signal, the split signal and the phase A permissive signal.

Upon initial operation of the traffic signal controller of FIGS. 9A, 9B and 9C, interval register 330 is operated through its steps 335–338 in the manner described supra. In the absence of a pedestrian call on phase A, steps 339 and 340 are electronically skipped as described to the extent that step 341 is operated upon termination of operation for step 338. In step 341, interval register 330 may continue to operate according to the detection of closely-spaced vehicles on phase A until the arrival of the offset signal. More particularly, the operation of vehicle memory flip-flop to a gap storage condition causes diode 383 to be forward-biased as described above permitting the output of step 341 to be shunted to ground. At any time prior to the arrival of the offset signal, the absence of a vehicle storage causes diode 383 to be back-biased thus permitting the output of step 341 to be applied through OR gate 386 to trigger circuit 77 for advancing the interval register 330 in the manner described supra. However, should the number of closely-spaced vehicles be sufficiently great, the operation of interval register 330 in its step 341 is terminated upon arrival of the offset signal. Normally, the output of step 341 is further coupled to ground at the offset signal terminal through resistor 404 and diode 405. Upon arrival of the offset signal, however, diode 405 is back-biased permitting the output of step 341 after amplification to be coupled through resistor 404 and OR gate 406 to trigger circuit 77 for causing interval register 330 to operate to its step 342.

Interval register 330 operates in its step 342 until a vehicle call or pedestrian call occurs on phase B or upon the arrival of the phase B permissive signal. More particularly, step 342 couples an output from its amplifier No. 8 to phase B driver 367 which together with a signal from vehicle memory flip-flop 272 or pedestrian memory flip-flop 277 causes a reset signal to be coupled to the steps 335–352 for clearing all steps except step 344 which it sets for operation. In addition, such output from flip-flop 272 or flip-flop 277 is coupled over a wire 408 to diode 409 for back-biasing such diode 409. Normally, the output of step 342 is coupled over wire 410 through resistor 411 and diode 409 to ground through resistor 295. Upon back-biasing diode 409, however, the output of step 342 is coupled through OR gate 386 to trigger circuit 77 for causing timing circuit 42 to provide its trigger signal output to bistable advance driver 60 for advancing operation to step 343. Step 343 also couples an output from its amplifier No. 9 to phase B driver 367 so that the operation of step 343 is a portion of the phase B permissive period as suggested in the chart of FIG. 9D. In the absence of vehicles detected on phase B as well as the absence of pedestrian calls, interval register 330 is operated from its step 342 to its step 343 upon arrival of the phase B permissive signal. More particularly, the output of step 342 is coupled over wire 389, through resistor 413 and diode 414 to ground at the phase B permissive signal terminal. Upon the arrival of the phase B permissive signal, however, diode 414 is back-biased permitting the output of step 342 to be coupled through OR gate 406 and switch 288 to trigger circuit 77 for causing interval register 330 to advance to its step 343 for operation. In the absence of a vehicle call or pedestrian call on phase B, interval register 330 recycles through its steps 338 and 341–343 in the manner described.

In the presence of a vehicle call on phase B, however, step 344 is operated to a set condition to permit transfer of operation in interval register 330 from step 342 or 343 to step 344 as phase B driver 367 receives an output from corresponding interval amplifiers numbers 8 and 9. In this connection, the absence of a phase B vehicle call or pedestrian call upon entering step 342 permits interval register 330 to advance to its step 343. If a vehicle call or pedestrian call occurs at this time, phase B driver 367 concurrently receives its two inputs for operating step 344 to its set condition and all other steps to clear conditions. Interval register 330 then operates as described supra through its steps 344–347 for the different time periods set for these particular intervals. Interval register 330 electronically skips its steps 348 and 349 in the absence of a pedestrian call on phase B and in turn operates from its step 347 to its step 350. As described above, as long as the no gap signal is produced by vehicle memory flip-flop 272, diode 396 is forward-biased to permit the output of step 350 to be coupled to ground through the circuit described. However, the no gap signal can be removed by the presence of a gap between vehicles which causes vehicle gap timer 370 to time its interval, thus coupling an output to vehicle memory flip-flop 272 causing it to be reset. Diode 396 is now reverse-biased by the gap signal which permits the output of step 350 to be coupled to trigger circuit 77 through OR gate 386 to cause operation of interval register 330 from its step 350 to step 351 in the manner described supra. If, however, a sufficient number of vehicles are detected on phase B, the operation of interval register 330 continues in its step 350 until the arrival of the split signal. More specifically, the output of step 350 is also coupled over wire 398 through resistor 415 and diode 416 to ground at the split signal terminal. In the presence of the split signal, however, diode 416 is reverse-biased which permits the output of step 350 to be coupled through OR gate 406 in switch 288 to trigger circuit 77 for causing the operation of interval register 330 from its step 350 to its step 351.

Step 351 of interval register 330 is a phase A permissive period step during the operation of which a phase A vehicle call or pedestrian call causes interval register 330 to operate to its step 352 and then to its step 335. In the absence of a vehicle call or pedestrian call for phase A, however, operation of step 351 is terminated upon arrival of the phase A permissive signal to permit operation of interval register 330 to its step 352. More specifically, vehicle memory flip-flop 360 is operated to a vehicle storage condition upon actuation of the relay VRA for phase A and therein provides a vehicle storage output. Such output is coupled through a diode 418 and resistor 419 to ground causing the top side of resistor 419 to be at a positive (+) potential. Such positive (+) potential is coupled to a diode 420 causing such diode to be reverse-biased. The output of step 351 is then coupled over wire 400, diode 422, resistor 423 and through OR gate 386 to trigger circuit 77 for causing interval register 330 to advance to its step 352. In the absence of vehicle detections on phase A, diode 420 is forward-biased which couples the output of step 351 to ground through resistor 419. Operation of interval register 330 then continues in its step 351 until the occurrence of the phase A permissive signal. In the absence of the phase A permissive signal, the output of step 351 is coupled over wire 400 and through resistor 427 and diode 428 to ground at the phase A permissive signal terminal. However, in the presence of the phase A permissive signal, diode 428 is reverse-biased to permit the output of step 351 to be coupled through OR gate 406 and switch 288 to trigger circuit 77 to cause interval register 330 to advance to its step 352. Interval register 330 operates in its step 352 for a minimum time interval during which time the output of its amplifier No. 18 is coupled to phase A driver 397 for causing phase A driver 397 to provide a resetting output to operate all steps 336–352 to clear conditions and step 335 to a set condition only if there is a phase A vehicle call or pedestrian call conditioning the phase A driver 397 over wire 402. In the absence of a phase A vehicle call or pedestrian call, timing circuit 42 is effective to immediately provide its trigger signal output in response to the output from interval amplifier No. 18 over wire 401. Interval register 330 then is operated to its step 347 over transfer wire 403.

Upon occurrence of a pedestrian call for phase B, pedestrian memory flip-flop 277 is operated to its storage condition in which an output is coupled to walk driver 278. Upon operation of interval register 330 to its step 347, an output is coupled from interval amplifier No. 13 corresponding to step 347 to walk driver 278. Walk driver 278 then is effective to cause interval register 330 to operate through its walk steps 348 and 349. Similarly, a pedestrian call on phase A causes pedestrian memory flip-flop 365 to operate to its storage condition in which an output is coupled to walk driver 368. Walk driver 368 then is effective upon operation of interval register 330 in its step 338 to operate through its walk steps 339 and 340 and thereafter as described above.

In the operation of the traffic signal controller of FIGS. 9A, 9B and 9C for either isolated control or coordinated control, the operation of bistable advance driver 60 couples a reset signal to timing circuit 42, vehicle gap timer 370 and maximum timer 280 for the purpose of resetting each such timer to its zero timing condition. In this operation, it is assured that timing for the next step of interval register 330 starts from a zero timing condition as timed by one or more of timing circuit 42, vehicle gap timer 370 or maximum timer 280. In this connection, vehicle gap timer 370 operates on the permissive period steps Nos. 8, 9, 17 and 18 as described above for the purpose of resetting the respective vehicle memory flip-flops and pedestrian memory flip-flops.

Various diodes are provided to prevent feed-arounds such as diodes 432 and 433 coupling respectively the outputs of steps 350 and 351 to vehicle gap timer 370 through variable resistor 373. It is further noted that the amplifiers Nos. 1–18 include diodes at their outputs where necessary in order to prevent feed-around circuits.

Having described a highway traffic signal controller of the pre-timed, semi-actuated and fully-actuated control types as specific embodiments of the present invention, it is desired to be understood that these forms are selected to facilitate in the disclosure of the invention rather than to limit the number of forms which it may assume; and, it is to be further understood that various modifications, adaptations and alterations may be applied to the specific forms shown to meet the requirements of practice without in any manner departing from the spirit or scope of the present invention.

What I claim is:

1. In a controller for controlling traffic signals through a cycle of operation at an intersection of interfering traffic lanes comprising, a ring counter having a plurality of different steps each of which includes at least one multi-aperture ferrite core operable to a clear condition and to a set condition, means responsive to any said core when in a set condition to control said traffic signals to display a predetermined combination of signal indications, bistable means comprising a pair of single aperture ferrite cores and being operable repeatedly between its opposite conditions in each of which a respective one of said single aperture cores is in a set condition, means for coupling said bistable means while operating in a first condition of operation to the odd-numbered of said steps of said ring counter and coupling said bistable means while operating in its second condition to the even-numbered of said steps of said ring counter, means controlled by said ring counter for measuring a time interval for each step of said plurality of different steps during which said ring counter is operable, said bistable means being responsive to said measuring means upon measurement of a time interval for electrically coupling the then-set single aperture core to its corresponding group of multi-aperture cores including a major aperture for each such core for operating a successively positioned core included in the other group of cores to a set condition, each of said multi-aperture ferrite cores including a transmitting minor aperture and a receiving minor aperture, transfer means coupling the transmitting minor aperture of a core in one group to the receiving minor aperture of a successive core in the other group of said cores, whereby the transfer operation between successive cores is effected upon operation of the corresponding one of the single aperture cores.

2. The controller according to claim 1 wherein each of said multi-aperture cores includes a readout minor aperture, amplifier means provided for each step of said electronic cycling means and coupled to the readout minor aperture of the core for that step, whereby said amplifier means for an operating core receives an input from that multi-aperture core at its readout minor aperture for activating such amplifier means for the time period established by said second-mentioned means for the corresponding step of said electronic cycling means, said traffic signal being controlled by the amplifier means then activated for providing a combination of indications allotted to the step in which said electronic cycling means is operating.

3. The controller according to claim 1 and further including means effective upon concurrent non-operation of all said amplifier means to operate the first-positioned multi-aperture core of said first group of cores to its set condition and the single-aperture core corresponding to said first group to its clear condition, whereby said traffic signal is controlled to display a combination of indications including a proceed indication for a preferred traffic movement direction.

References Cited by the Examiner

UNITED STATES PATENTS

| | | | |
|---|---|---|---|
| 3,072,883 | 1/1963 | Hendricks | 340—41 |
| 3,090,032 | 5/1963 | Shand | 340—41 |

FOREIGN PATENTS

| | | |
|---|---|---|
| 1,152,643 | 8/1963 | Germany. |

NEIL C. READ, *Primary Examiner.*

THOMAS B. HABECKER, *Examiner.*